(12) United States Patent
Wang et al.

(10) Patent No.: US 11,842,468 B2
(45) Date of Patent: Dec. 12, 2023

(54) SYNTHESIZING DIGITAL IMAGES UTILIZING IMAGE-GUIDED MODEL INVERSION OF AN IMAGE CLASSIFIER

(71) Applicant: Adobe Inc., San Jose, CA (US)

(72) Inventors: Pei Wang, Irvine, CA (US); Yijun Li, Seattle, WA (US); Jingwan Lu, Santa Clara, CA (US); Krishna Kumar Singh, San Jose, CA (US)

(73) Assignee: Adobe Inc., San Jose, CA (US)

( * ) Notice: Subject to any disclaimer, the term of this patent is extended or adjusted under 35 U.S.C. 154(b) by 260 days.

(21) Appl. No.: 17/178,681

(22) Filed: Feb. 18, 2021

(65) Prior Publication Data

US 2022/0261972 A1 Aug. 18, 2022

(51) Int. Cl.
| | | |
|---|---|---|
| *G06K 9/00* | (2022.01) | |
| *G06T 5/50* | (2006.01) | |
| *G06N 3/04* | (2023.01) | |
| *G06V 10/75* | (2022.01) | |
| *G06F 18/22* | (2023.01) | |
| *G06F 18/24* | (2023.01) | |

(52) U.S. Cl.
CPC ............... *G06T 5/50* (2013.01); *G06F 18/22* (2023.01); *G06F 18/24* (2023.01); *G06N 3/04* (2013.01); *G06V 10/751* (2022.01); *G06T 2207/20081* (2013.01); *G06T 2207/20084* (2013.01); *G06T 2207/20221* (2013.01); *G06V 10/759* (2022.01)

(58) Field of Classification Search
CPC ............ G06T 5/50; G06T 2207/20081; G06T 2207/20084; G06T 2207/20221; G06F 18/22; G06F 18/24; G06N 3/04; G06N 3/0475; G06N 3/088; G06V 10/751; G06V 10/759; G06V 10/82
See application file for complete search history.

(56) References Cited

U.S. PATENT DOCUMENTS

2022/0180203 A1\* 6/2022 Zhou ..................... G06N 3/047

OTHER PUBLICATIONS

Karnewar, MSG-GAN: Multi-Scale Gradients for Generative Adversarial Networks, 2020, IEEE CVPR (Year: 2020).\*

(Continued)

*Primary Examiner* — Alex Kok S Liew
(74) *Attorney, Agent, or Firm* — Keller Preece PLLC

(57) ABSTRACT

This disclosure describes methods, non-transitory computer readable storage media, and systems that utilize image-guided model inversion of an image classifier with a discriminator. The disclosed systems utilize a neural network image classifier to encode features of an initial image and a target image. The disclosed system also reduces a feature distance between the features of the initial image and the features of the target image at a plurality of layers of the neural network image classifier by utilizing a feature distance regularizer. Additionally, the disclosed system reduces a patch difference between image patches of the initial image and image patches of the target image by utilizing a patch-based discriminator with a patch consistency regularizer. The disclosed system then generates a synthesized digital image based on the constrained feature set and constrained image patches of the initial image.

20 Claims, 15 Drawing Sheets

(56) References Cited

OTHER PUBLICATIONS

Rameen Abdal, Yipeng Qin, and Peter Wonka. age2stylegan: How to embed images into the stylegan latent space? In Proceedings of the IEEE international conference on computer vision, pp. 4432-4441, 2019.

Marco Ancona, Enea Ceolini, CengizOztireli, and Markus Gross. Towards better understanding of gradient-based attribution methods for deep neural networks.ICLR, 2018.

Martin Arjovsky, Soumith Chintala, and Leon Bottou. "Wasserstein gan." arXiv preprint arXiv:1701.07875, 2017.

David Bau, Hendrik Strobelt, William Peebles, Bolei Zhou, Jun-Yan Zhu, Antonio Torralba, et al. Semantic photo manipulation with a generative image prior.arXiv preprint arXiv:2005.07727, 2020.

David Bau, Jun-Yan Zhu, Jonas Wulff, William Peebles, Hendrik Strobelt, Bolei Zhou, and Antonio Torralba. Seeing what a gan cannot generate. In Proceedings of the IEEE International Conference on Computer Vision, pp. 4502-4511, 2019.

Andrew Brock, Jeff Donahue, and Karen Simonyan. Large scale GAN training for high fidelity natural image synthesis. In International Conference on Learning Representations, 2019.

M. Cimpoi, S. Maji, I. Kokkinos, S. Mohamed, , and A. Vedaldi. Describing textures in the wild. In Proceedings of the IEEE Conf. on Computer Vision and Pattern Recognition (CVPR), 2014.

Jia Deng, Wei Dong, Richard Socher, Li-Jia Li, Kai Li, and Li Fei-Fei. Imagenet: A large-scale hierarchical image database. In 2009 IEEE conference on computer vision and pattern recognition, pp. 248-255. Ieee, 2009.

Len Du. How much deep learning does neural style transfer really need? an ablation study. In the IEEE Winter Conference on Applications of Computer Vision, pp. 3150-3159, 2020.

Matt Fredrikson, Somesh Jha, and Thomas Ristenpart. Model inversion attacks that exploit confidence information and basic countermeasures. In Proceedings of the 22nd ACM SIGSAC Conference on Computer and Communications Security, pp. 1322-1333, 2015.

Ian Goodfellow, Jean Pouget-Abadie, Mehdi Mirza, Bing Xu, David Warde-Farley, Sherjil Ozair, Aaron Courville, and Yoshua Bengio. Generative adversarial nets. In Advances in neural information processing systems, pp. 2672-2680, 2014.

Ian J Goodfellow, Jonathon Shlens, and Christian Szegedy. Explaining and harnessing adversarial examples. ICLR, 2015.

Sigal Gottlieb and Chi-Wang Shu. Total variation diminishing runge-kutta schemes. Mathematics of computation, 67(221):73-85, 1998.

Yash Goyal, Ziyan Wu, Jan Ernst, Dhruv Batra, Devi Parikh, and Stefan Lee. Counterfactual visual explanations. ICML, 2019.

Jinjin Gu, Yujun Shen, and Bolei Zhou. Image processing using multi-code gan prior. In Proceedings of the IEEE/CVF Conference on Computer Vision and Pattern Recognition, pp. 3012-3021, 2020.

Ishaan Gulrajani, Faruk Ahmed, Martin Arjovsky, Vincent Dumoulin, and Aaron C Courville. Improved training of wasserstein gans. In Advances in neural information processing systems, pp. 5767-5777, 2017.

Martin Heusel, Hubert Ramsauer, Thomas Unterthiner, Bernhard Nessler, and Sepp Hochreiter. Gans trained by a two time-scale update rule converge to a local nash equilibrium. InAdvances in neural information processing systems, pp. 6626-6637, 2017.

Phillip Isola, Jun-Yan Zhu, Tinghui Zhou, and Alexei A Efros. Image-to-image translation with conditional adversarial networks. InProceedings of the IEEE conference on computer vision and pattern recognition, pp. 1125-1134, 2017.

Justin Johnson, Alexandre Alahi, and Li Fei-Fei. Perceptual losses for real-time style transfer and super-resolution. In European conference on computer vision, pp. 694-711. Springer, 2016.

Tero Karras, Samuli Laine, and Timo Aila. A style-based generator architecture for generative adversarial networks. In Proceedings of the IEEE conference on computer vision and pattern recognition, pp. 4401-4410, 2019.

Chuan Li and Michael Wand. Precomputed real-time texture synthesis with markovian generative adversarial networks. In European conference on computer vision, pp. 702-716. Springer, 2016.

Aravindh Mahendran and Andrea Vedaldi. Understanding deep image representations by inverting them. In Proceedings of the IEEE conference on computer vision and pattern recognition, pp. 5188-5196, 2015.

Mehdi Mirza and Simon Osindero. Conditional generative adversarial nets.arXiv preprint arXiv:1411.1784, 2014.

Anh Nguyen, Jeff Clune, Yoshua Bengio, Alexey Dosovitskiy, and Jason Yosinski. Plug & play generative networks: Conditional iterative generation of images in latent space. In Proceedings of the IEEE Conference on Computer Vision and Pattern Recognition, pp. 4467-4477, 2017.

Anh Nguyen, Alexey Dosovitskiy, Jason Yosinski, Thomas Brox, and Jeff Clune. Synthesizing the preferred inputs for neurons in neural networks via deep generator networks. In Advances in neural information processing systems, pp. 3387-3395, 2016.

Augustus Odena, Christopher Olah, and Jonathon Shlens. Conditional image synthesis with auxiliary classifier gans. In International conference on machine learning, pp. 2642-2651, 2017.

Xingang Pan, Xiaohang Zhan, Bo Dai, Dahua Lin, Chen Change Loy, and Ping Luo. Exploiting deep generative prior for versatile image restoration and manipulation. European Conference on Computer Vision (ECCV), 2020.

Tamar Rott Shaham, Tali Dekel, and Tomer Michaeli. Singan: Learning a generative model from a single natural image. InComputer Vision (ICCV), IEEE International Conference on, 2019.

Tim Salimans, Ian Goodfellow, Wojciech Zaremba, Vicki Cheung, Alec Radford, and Xi Chen. Improved techniques for training gans. In Advances in neural information processing systems, pp. 2234-2242, 2016.

Ramprasaath R Selvaraju, Michael Cogswell, Abhishek Das, Ramakrishna Vedantam, Devi Parikh, and Dhruv Batra. Grad-cam: Visual explanations from deep networks via gradient-based localization. In Proceedings of the IEEE international conference on computer vision, pp. 618-626, 2017.

Yujun Shen, Jinjin Gu, Xiaoou Tang, and Bolei Zhou. Interpreting the latent space of gans for semantic face editing. In Proceedings of the IEEE/CVF Conference on Computer Vision and Pattern Recognition (CVPR), Jun. 2020.

Assaf Shocher, Shai Bagon, Phillip Isola, and Michal Irani. Ingan: Capturing and retargeting the "dna" of a natural image. In Proceedings of the IEEE/CVF International Conference on Computer Vision (ICCV), Oct. 2019.

Assaf Shocher, Yossi Gandelsman, Inbar Mosseri, Michal Yarom, Michal Irani, William T Freeman, and Tali Dekel. Semantic pyramid for image generation. In Proceedings of the IEEE/CVF Conference on Computer Vision and Pattern Recognition, pp. 7457-7466, 2020.

Karen Simonyan, Andrea Vedaldi, and Andrew Zisserman. Deep inside convolutional networks: Visualising image classification models and saliency maps. arXiv preprint arXiv:1312.6034, 2013.

Jiawei Su, Danilo Vasconcellos Vargas, and Kouichi Sakurai. One pixel attack for fooling deep neural networks. IEEE Transactions on Evolutionary Computation, 23(5):828-841, 2019.

Mukund Sundararajan, Ankur Taly, and Qiq iYan. Axiomatic attribution for deep networks. ICML, 2017.

Christian Szegedy, Wojciech Zaremba, Ilya Sutskever, Joan Bruna, Dumitru Erhan, Ian Goodfellow, and Rob Fergus. Intriguing properties of neural networks. arXiv preprint arXiv:1312.6199, 2013.

Pei Wang and Nuno Vasconcelos. Scout: Self-aware discriminant counterfactual explanations. In Proceedings of the IEEE/CVF Conference on Computer Vision and Pattern Recognition, pp. 8981-8990, 2020.

P. Welinder, S. Branson, T. Mita, C. Wah, F. Schroff, S. Belongie, and P. Perona. Caltech-UCSD Birds 200. Technical Report CNS-TR-2010-001, California Institute of Technol- ogy, 2010.

Hongxu Yin, Pavlo Molchanov, Jose M Alvarez, Zhizhong Li, Arun Mallya, Derek Hoiem, Niraj K Jha, and Jan Kautz. Dreaming to distill: Data-free knowledge transfer via deep-inversion. In Proceedings of the IEEE/CVF Conference on Computer Vision and Pattern Recognition, pp. 8715-8724, 2020.

(56) References Cited

OTHER PUBLICATIONS

Jason Yosinski, Jeff Clune, Anh Nguyen, Thomas Fuchs, and Hod Lipson. Understanding neural networks through deep visualization. arXiv preprint arXiv:1506.06579, 2015.

Richard Zhang, Phillip Isola, Alexei A Efros, Eli Shechtman, and Oliver Wang. The unreasonable effectiveness of deep features as a perceptual metric. In CVPR, 2018.

Bolei Zhou, Aditya Khosla, Agata Lapedriza, Aude Oliva, and Antonio Torralba. Learning deep features for discriminative localization. In Proceedings of the IEEE conference on computer vision and pattern recognition, pp. 2921-2929, 2016.

Bolei Zhou, Agata Lapedriza, Aditya Khosla, Aude Oliva, and Antonio Torralba. Places: A 10 million image database for scene recognition.IEEE Transactions on Pattern Analysis and Machine Intelligence, 2017.

Jiapeng Zhu, Yujun Shen, Deli Zhao, and Bolei Zhou. In-domain gan inversion for real image editing. In Proceedings of European Conference on Computer Vision (ECCV), 2020.

Leon Gatys, Alexander S Ecker, and Matthias Bethge. Texture synthesis using convolutional neural networks. In Advances in neural information processing systems, pp. 262-270, 2015.

Robert Geirhos, Patricia Rubisch, Claudio Michaelis, Matthias Bethge, Felix A Wichmann, and Wieland Brendel. Imagenet-trained cnns are biased towards texture; increasing shape bias improves accuracy and robustness. ICLR, 2019.

Kaiming He, Xiangyu Zhang, Shaoqing Ren, and Jian Sun. Deep residual learning for image recognition. In Proceedings of the IEEE conference on computer vision and pattern recognition, pp. 770-778, 2016.

Alex Krizhevsky, Ilya Sutskever, and Geoffrey E Hinton. Imagenet classification with deep convolutional neural networks. In Advances in neural information processing systems, pp. 1097-1105, 2012.

Shibani Santurkar, Andrew Ilyas, Dimitris Tsipras, Logan Engstrom, Brandon Tran, and Aleksander Madry. Image synthesis with a single (robust) classifier. In Advances in Neural Information Processing Systems, pp. 1262-1273, 2019.

Karen Simonyan and Andrew Zisserman. Very deep convolutional networks for large-scale image recognition. arXiv preprint arXiv:1409.1556, 2014.

* cited by examiner

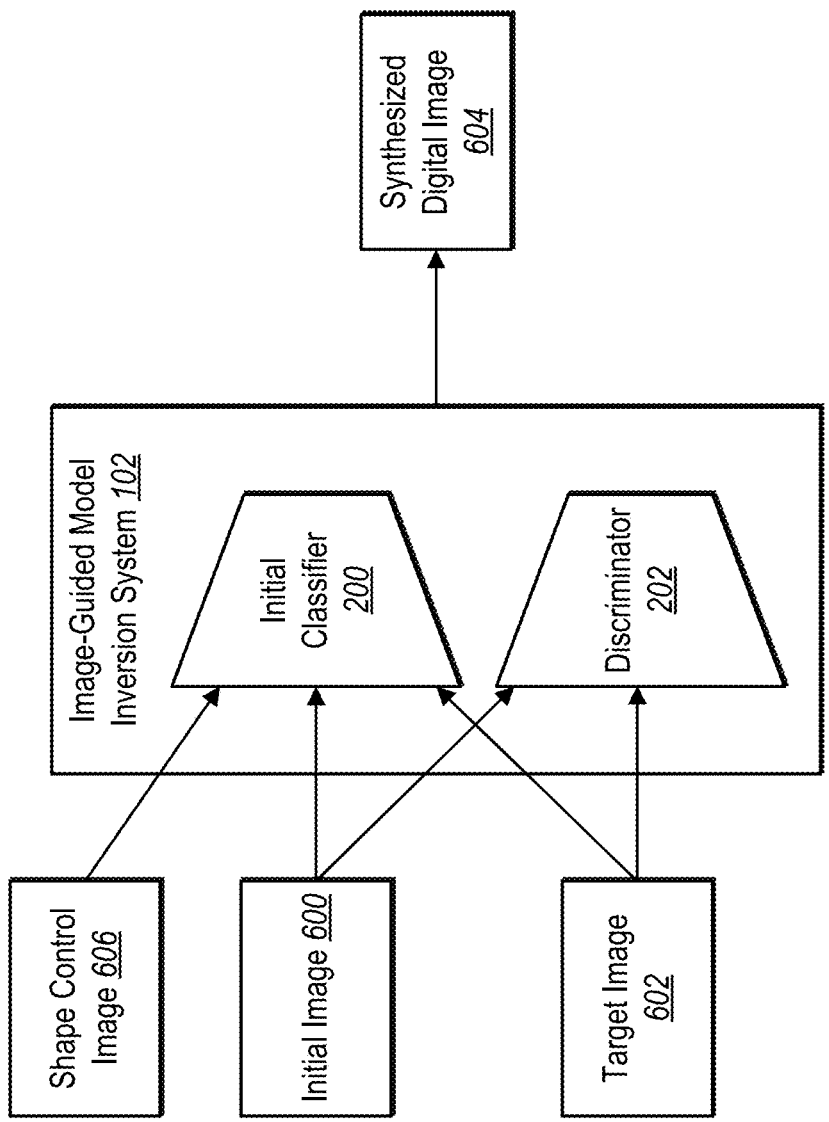

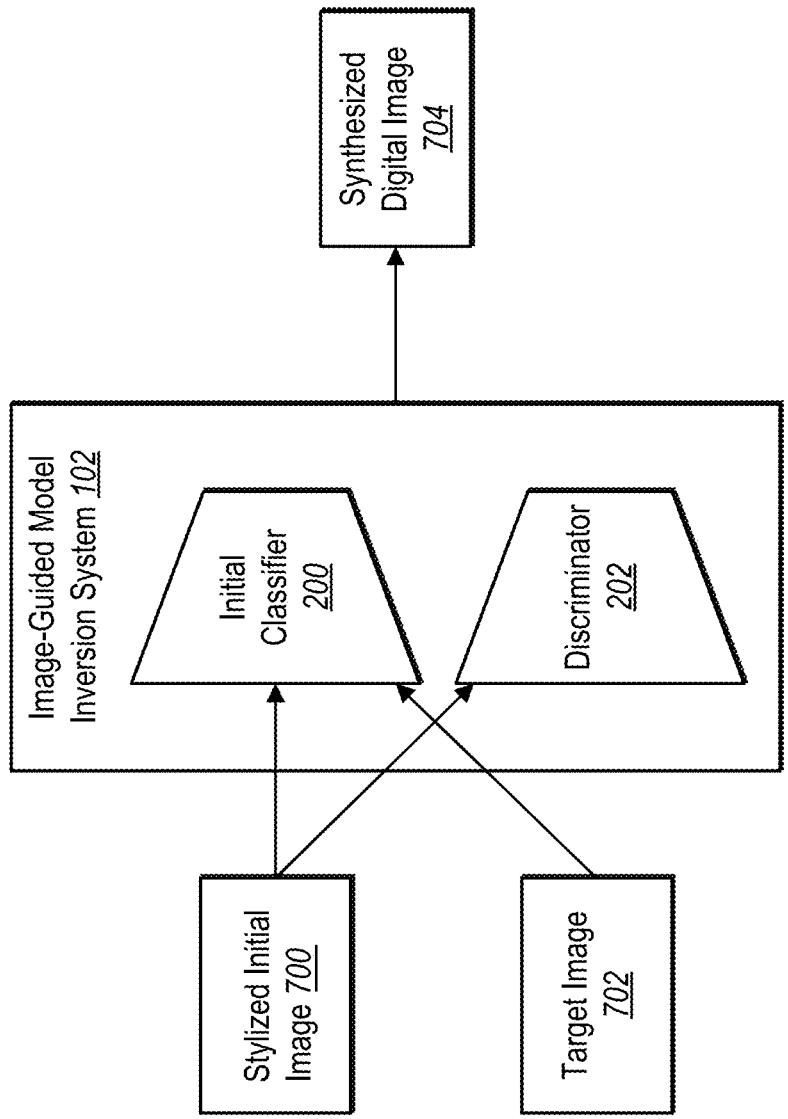

SYNTHESIZING DIGITAL IMAGES UTILIZING IMAGE-GUIDED MODEL INVERSION OF AN IMAGE CLASSIFIER

BACKGROUND

Improvements to computer processing technologies have led to significant advancements in the fields of image processing and machine-learning. For example, conventional image processing systems utilize machine-learning to generate synthetic digital images that include objects or scenes that imitate realistic images. Synthetic digital images can be a valuable tool for augmenting datasets of digital images used to train machine-learning models. Additionally, synthetic digital images can also provide unique, semantically meaningful variants of designs or scenes from a reference image for use in content creation tasks (e.g., graphic design applications).

Synthetically generating images to include objects or scenery that appear realistic or that have meaningful differences from reference or training images, however, can be a difficult task for computer systems. Specifically, conventional image generation systems that utilize machine-learning to generate synthetic images lack flexibility and accuracy. For example, some existing systems utilize generative adversarial networks ("GANs") to synthesize digital images. Some conventional systems that utilize GANs to synthesize digital images based on a target image explicitly train the GAN for the target image. While these conventional systems utilize patch-based GANs to enforce patch consistency across resolutions to generate multi-scale structures in synthetic images, the conventional systems are limited to synthesizing repetitive images (e.g., for scenes with mountains). For instance, patch-based GANs are less effective at capturing high-level semantics (e.g., related to object identities, shapes, part consistency), which results in inaccuracies when synthesizing non-repetitive objects.

Furthermore, some conventional systems utilize GANs based on GAN projection (or inversion) to project a target image into a latent space and then modify the projection. In particular, the conventional systems alter the representation of the target image in the latent space by jittering the projection (e.g., via small modifications) and then synthesize a new image from the jittered projection. These conventional systems, however, often produce unrealistic images due to the projected latent representations falling outside of a learning distribution of the GAN. Additionally, because these conventional systems utilize GANs trained on specific domains, the conventional systems are unable to generalize the projections to other domains. Accordingly, the conventional systems that utilize GANs to synthesize images lack both flexibility and accuracy when synthesizing images for content outside specific domains/target images.

Conventional image processes systems that utilize GANs to synthesize digital images also lack efficiency. Specifically, as mentioned, conventional systems often train the GANs on specific target images or for specific domains to synthesize digital images based on the target image or within the domains. Because such conventional systems train both generative neural networks and discriminative neural networks in a generative adversarial process, the conventional systems can require significant computing resources and/or time in an image synthesis operation. Additionally, such systems typically must retrain the neural networks for synthesis for each different target image or domain.

SUMMARY

This disclosure describes one or more embodiments of methods, non-transitory computer readable media, and systems that solve one or more of the foregoing problems (in addition to providing other benefits) by synthesizing digital images utilizing image-guided model inversion of an image classifier. In particular, in one or more embodiments, the disclosed systems utilize a neural network image classifier to encode features of the initial image and the target image. The disclosed systems then constrain the features of the initial image relative to the features of the target image at a plurality of layers of the neural network image classifier. Additionally, the disclosed systems constrain image patches of the initial image to image patches of the target image by utilizing a patch-based discriminator that reduces a patch difference between the image patches of the initial image and the target image. In this manner, the disclosed systems can improve the flexibility and accuracy of computing systems in synthesizing meaningful variations of a target digital image. Still further, in one or more implementations, the disclosed systems provide for object position control in the synthesized digital images.

BRIEF DESCRIPTION OF THE DRAWINGS

The detailed description refers to the drawings briefly described below.

FIGS. 6A-6B illustrate diagrams of the image-guided model inversion system utilizing a shape control image to control a shape of content in a synthesized digital image in accordance with one or more implementations.

FIGS. 7A-7B illustrate diagrams of the image-guided model inversion system utilizing a stylized image to control a style of content in a synthesized digital image in accordance with one or more implementations.

DETAILED DESCRIPTION

Figure 1:
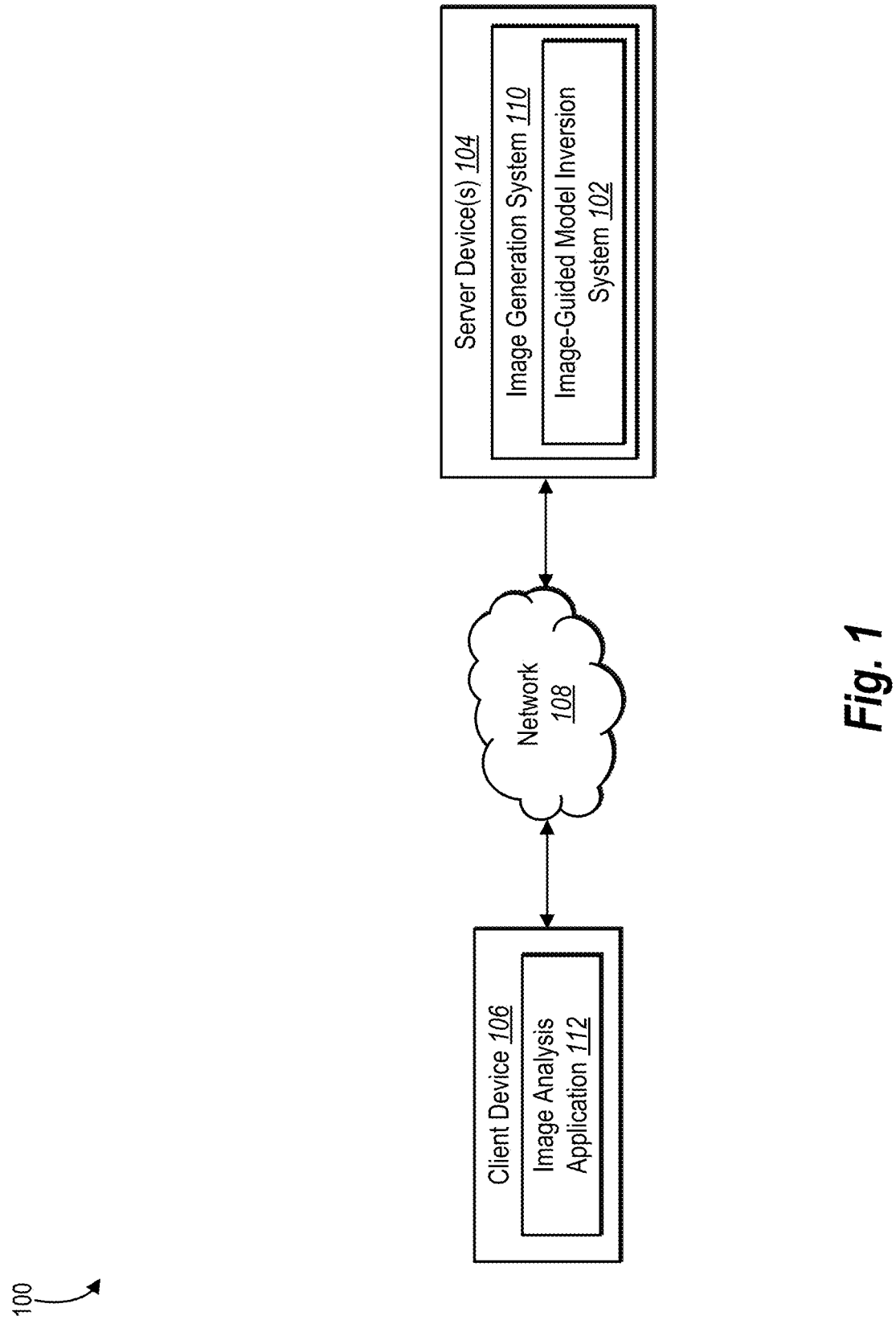
FIG. 1 illustrates a block diagram of a system environment in which an image-guided model inversion system is implemented in accordance with one or more implementations.

This disclosure describes one or more embodiments of an image-guided model inversion system (or "model inversion system") that improves computing systems that synthesize digital images by utilizing image-guided model inversion of an image classifier with an external discriminator. Specifically, in one or more embodiments, the model inversion system utilizes an encoder of a neural network image classifier to generate a first feature set for an initial image and a second feature set for a target image (e.g., a guide image). The model inversion system then constrains the first feature set relative to the second feature set at a plurality of layers of the neural network image classifier. Additionally, the model inversion system constrains image patches of the initial image relative to image patches of the target image by utilizing a patch-based discriminator. By constraining the features and image patches of the initial image based on features and image patches of the target image utilizing an image classifier and a discriminator, the model inversion system accurately and flexibly synthesizes a digital image based on the target image.

As mentioned, in one or more embodiments, the model inversion system generates a first feature set for an initial image (e.g., a randomly initialized digital image) and a second feature set for a target image. Specifically, the model inversion system utilizes an encoder of a neural network image classifier to generate the feature sets of the initial image and the target image. For instance, the model inversion system utilizes an image classifier that includes a plurality of neural network layers that generate multi-level feature representations of an image. Accordingly, the model inversion system generates feature representations for a digital image that the image classifier processes at a plurality of different neural network layers.

In one or more embodiments, the model inversion system constrains the feature set of the initial image relative to the feature set of the target image. For instance, the model inversion system utilizes a feature distribution regularizer that reduces a feature distance between the feature set of the initial image and the feature set of the target image at each of a plurality of neural network layers of the image classifier. To illustrate, the model inversion system utilizes the feature distribution regularizer to reduce a statistical distance (e.g., a channel-wise mean and standard deviation) of feature maps for the initial image and the target image generated at one or more neural network layers of the image classifier.

In additional embodiments, the model inversion system utilizes a discriminator to constrain image patches of an initial image relative to a target image. Specifically, the model inversion system utilizes a patch consistency regularizer that reduces a patch difference between the image patches of the initial image and the image patches of the target image. Specifically, the model inversion system utilizes a patch-based discriminator to discriminate between the initial image and the target image based on patches in the initial image and patches in the target image.

Furthermore, in one or more embodiments, the model inversion system generates a synthesized digital image by constraining feature set and image patches of an initial image relative to a target image. Specifically, by reducing a feature distance and a patch distance between the initial image and the target image, the model inversion system accurately synthesizes a digital image based on the target image. Additionally, in one or more embodiments, the model inversion system utilizes a plurality of synthesis iterations to further synthesize additional digital images, such as by processing the initial image a plurality of times utilizing the image classifier and the discriminator. To illustrate, the model inversion system iteratively synthesizes digital images utilizing the image classifier and discriminator and then learns parameters of the discriminator to improve performance of the discriminator during synthesis.

According to one or more embodiments, the model inversion system utilizes additional controls to influence content in a synthesized digital image. For example, in one or more embodiments, the model inversion system controls a position of one or more objects in a synthesized digital image based on a saliency map. In particular, model inversion system utilizes a location regularizer to constrain the location of content in a synthesized digital image to a position indicated by the saliency map.

In one or more additional embodiments, the model inversion system controls a shape of one or more objects in a synthesized digital image. In particular, the model inversion system controls a shape of an object based on a shape control image. In particular, model inversion system utilizes a feature distribution matching regularizer to constrain a shape of content in a synthesized digital image to a shape indicated by the shape control image.

In one or more embodiments, the model inversion system controls a style of a synthesized digital image. In particular, the model inversion system controls a style of an object within a synthesized digital image. In particular, model inversion system utilizes a stylized image as the initial image (e.g., as opposed to a randomly initialized image) to cause a resulting synthesized digital image to have a style of the stylized image.

The disclosed model inversion system provides a number of advantages/advances over conventional systems. For example, in one or more embodiments, the model inversion system improves flexibility and accuracy relative to conventional systems that synthesize digital images. To illustrate, in contrast to the previously mentioned conventional systems that are limited in usefulness to synthesizing digital images relative to specific target images or domains, the model inversion system can more flexibly generate synthesized digital images by utilizing image-guided model inversion of an image classifier with a discriminator. Indeed, by utilizing model inversion of an image classifier and a discriminator with an image guide, the model inversion system can provide more accurate image synthesis for a variety of different domains and image content types. Specifically, the model inversion system can provide variety during synthesis of digital images while enforcing semantic specificity constraints.

The model inversion system also improves the flexibility of computing systems by providing additional control over the content in synthesized digital images. For instance, by utilizing an image classifier and discriminator to process position control images, shape control images, and stylized images when synthesizing digital images with a target image, the model inversion system provides control over positions, shapes, and styles of content within the digital synthesized images. Thus, in contrast to conventional systems that are limited to synthesizing based on training of a generative neural network, in one or more embodiments, the model inversion system is able to synthesize a wide variation of synthesized image content with more specific control over the content via intuitive user controls.

Additionally, the model inversion system improves efficiency of computing systems that implement digital image synthesis. In particular, as noted, conventional systems typically utilize generative adversarial training that involves training generative neural networks and discriminator neural networks. By synthesizing digital images via image-guided model inversion of a pre-trained image classifier, the model inversion system reduces the amount of training required (e.g., by eliminating training of a generator) to accurately synthesize digital images across a variety of domains while producing realistic images.

As illustrated by the foregoing discussion, the present disclosure utilizes a variety of terms to describe features and advantages of the model inversion system. Additional detail is now provided regarding the meaning of such terms. For example, as used herein, the term "digital image" refers to a computer representation of visual content. In one or more embodiments, a digital image includes, but is not limited to, a digital photograph, a digital video frame, a computer-generated image, or a digitally scanned image. Additionally, in one or more embodiments, the term "synthesized digital image" refers to a computer-generated representation of visual content. More specifically, a synthesized digital image includes a synthetic image generated by a computing device from a form of image description (e.g., based on a feature description or based on a target image).

Furthermore, as used herein, the term "initial image" refers to a digital image used as a basis for a synthesized digital image. For example, an initial image includes a randomly initialized noise image. In particular, the term "randomly initialized noise image" refers to a randomly generated image based on a noise vector. For example, a randomly initialized noise image, in one or more embodiments, includes a plurality of randomly selected color values for a plurality of pixels in the image. In one or more alternative embodiments, an initial image includes a stylized image.

As used herein, the term "stylized image" includes a digital image comprising a specific visual pattern or aesthetic that influences a visual style of a synthesized digital image. For example, stylized images comprise digital image having a particular artistic style, color scheme, or other artistic theme. For example, a stylized image includes an image of a background, texture, pattern, or object for use in transferring one or more visual characteristics of the background, texture, pattern, or object to a synthesized digital image.

As used herein, the term "saliency map" refers to a visual representation of a distribution for controlling a position of content in a synthesized digital image. For instance, a saliency map highlights image regions responsible for class predictions to control the positions of synthesized digital content in synthesized digital images. To illustrate, a saliency map includes an image including a visual representation of a Gaussian distribution (or Gaussian blob) indicating a focus of attention for a neural network classifier.

As used herein, the term "shape control image" refers to a digital image including a shape to control a shape of content in a synthesized digital image. In particular, a shape control image includes a visual representation of a shape to indicate a desired semantic property for an object or other digital content in a synthesized digital image. For example, a shape control image includes a hand-drawn or computer-generated image (e.g., a clipart image) with an object having a desired shape that is different from a shape in a target image to control the resulting shape for synthesizing digital content.

As used herein, the term "target image" refers to a digital image for guiding synthesis of a digital image. In one or more embodiments, a target image includes an image guide for comparison to an initial image or a synthesized (or partially synthesized) digital image at one or more steps of an image synthesis process. For example, a target image includes visual elements (e.g., objects) that guide synthesis of visual elements in a synthesized digital image.

As used herein, the term "feature set" refers to an abstract representation of a digital image. In one or more embodiments, a feature set includes one or more vectors generated at one or more layers of a neural network image classifier by embedding features of a digital image into the vector(s). For example, a neural network image classifier generates a first vector at a first neural network layer, a second vector at a second neural network layer, etc. In such embodiments, a feature set includes the first vector, the second vector, etc. Furthermore, in one or more embodiments, a feature set includes feature statistics associated with the features of a digital image such as a channel-wise mean and a standard deviation associated with a distribution of the features.

As used herein, the terms "image classifier" and "neural network image classifier" refer to a computer-implemented model that processes and labels digital images into classes based on content of the digital images. For example, an image classifier includes a neural network comprising a computer representation that can be tuned (e.g., trained) based on inputs to approximate unknown functions. In particular, an image classifier can include one or more layers that utilize algorithms to learn from, and make predictions on, known data by analyzing the known data to learn to generate outputs that reflect patterns and attributes of the known data. In some embodiments, a machine-learning model can include one or more neural networks including, but not limited to, a convolutional neural network, a recurrent neural network, or a deep-learning model. In one or more embodiments, an image classifier includes a pre-trained neural network trained on a plurality of digital images and classifications.

As used herein, the terms "discriminator" and "patch-based discriminator" refer to a computer-implemented model that compares a synthesized digital image to a target image by classifying the synthesized digital image based on the target image. For example, a discriminator compares portions (e.g., image patches) of a synthesized digital image to portions of a target image. In one or more embodiments, the discriminator includes a neural network that learns to discriminate between a synthesized digital image and a target image. Additionally, as used herein, the term "image patch" refers to a group of pixels in a digital image. In one or more embodiments, a discriminator compares patches of equal size from a synthesized digital image and a target image.

As used herein, the term "regularizer" refers to a function that imposes a constraint during synthesis of a digital image. For example, a feature distribution regularizer constrains features of an initial image relative to features of a target image. In one or more embodiments, a patch consistency regularizer constrains image patches of an initial image relative to a target image. In one or more embodiments, one or more additional regularizers impose one or more additional constraints during synthesis of a digital image, such as by constraining statistical components of a synthesized digital image, location of content in a synthesized digital image, or other aspects of a synthesized digital image.

Turning now to the figures, FIG. 1 includes an embodiment of a system environment 100 in which an image-guided model inversion system 102 (also referred to as a "model inversion system 102") operates. In particular, the system environment 100 includes server device(s) 104 and a client device 106 in communication via a network 108. Moreover, as shown, the server device(s) 104 include an image generation system 110, which includes the model inversion system 102. Additionally, the client device 106 includes an image generation application 112.

As shown in FIG. 1, in one or more embodiments, the server device(s) 104 includes or hosts the image generation system 110. Specifically, the image generation system 110 includes, or is part of, one or more systems that implement the management of digital images for use in one or more environments. For example, the image generation system 110 provides tools for generating, viewing, storing, and/or analyzing digital images. In one or more embodiments, the image generation system 110 uses the digital images in a variety of applications such as, but not limited to, databases of digital media assets, machine-learning model training, or content creation/digital design applications. In one or more embodiments, the image generation system 110 provides digital images to another system such as a system/application at the client device 106 or to a third-party system.

In connection with providing tools for managing digital images, the image generation system 110 utilizes the model inversion system 102 to synthesize digital images. For example, the image generation system 110 receives a request from the client device 106 or from another system to generate digital images. The image generation system 110 then uses the model inversion system 102 to generate one or more synthetic digital images. For instance, the image generation system 110 provides synthesized digital images to the client device 106 for processing via the image generation application 112 in response to a request from the client device 106. In one or more embodiments, the image generation system 110 also receives requests to control one or more aspects of image synthesis, such as by controlling a position, shape, or style of content of synthesized digital images.

In one or more embodiments, the model inversion system 102 utilizes an image classifier and a discriminator to accurately and flexibly synthesize digital images. For example, the model inversion system 102 utilizes a neural network image classifier (e.g., a pre-trained image classifier) to constrain features of a digital image relative to a target image when synthesizing digital images to enforce semantic consistency between a synthesized digital image and a target image. Specifically, the model inversion system 102 utilizes the image classifier to extract features of digital images based on content of the digital images and label the digital images according to the extracted features. Accordingly, the model inversion system 102 leverages the semantic knowledge in features extracted at a plurality of layers of the image classifier to reduce a feature distance between an initial image input to the image classifier and a target image via a feature distribution regularizer.

Additionally, in one or more embodiments, the model inversion system 102 utilizes a discriminator to generate realistic synthesized digital images. In particular, the model inversion system 102 utilizes a patch-based discriminator to constrain image patches of digital images relative to image patches of a target image to improve image details and generate more realistic synthesized digital images. For example, the model inversion system 102 utilizes the discriminator to reduce a patch difference between an initial image input to the discriminator and a target image via a patch consistency regularizer based on the discriminator.

By utilizing the model inversion system 102 to synthesize digital images, the image generation system 110 provides additional digital images for one or more applications. To illustrate, the image generation system 110 augments a database of digital images with visually varying content to improve neural networks or other machine-learning models during training operations utilizing the augmented database. Accordingly, the image generation system 110 stores the synthesized digital images in the database of digital images (e.g., at the server device(s) 104 or via a third-party database). The client device 106 (or other client devices) can then access the augmented database of digital images for processing via the image generation application 112.

In one or more embodiments, the server device(s) 104 include a variety of computing devices, including those described below with reference to FIG. 11. For example, the server device(s) 104 includes one or more servers for storing and processing data associated with digital images. In some embodiments, the server device(s) 104 also include a plurality of computing devices in communication with each other, such as in a distributed storage environment. In some embodiments, the server device(s) 104 include a content server. The server device(s) 104 can also include an application server, a communication server, a web-hosting server, a social networking server, a digital content campaign server, or a digital communication management server.

In one or more embodiments, the server device(s) 104 include components associated with neural networks and training data for training one or more neural networks (e.g., a patch-based discriminator). In one or more embodiments, the server device(s) 104 (e.g., the model inversion system 102 or another system) train neural network layers of the neural network(s). For example, the server device(s) 104 also trains the neural network layers using synthesized digital images generated by the model inversion system 102 utilizing an image classifier and target images associated with the synthesized digital images.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 11. Furthermore, although not shown in FIG. 1, the client device 106 can be operated by a user (e.g., a user included in, or associated with, the system environment 100) to perform a variety of functions. In particular, the client device 106 performs functions such as, but not limited to, accessing, viewing, analyzing, and interacting with digital content (e.g., digital images) via the image generation application 112. The client device 106 also performs functions for generating, capturing, or accessing data to provide to the image generation system 110 and the model inversion system 102 in connection with synthesizing digital images. For example, the client device 106 communicates with the server device(s) 104 via the network 108 to provide controls or constraints (e.g., position, shape, style controls for content) while synthesizing digital images. Although FIG. 1 illustrates the system environment 100 with a single client device 106, the system environment 100 can include a different number of client devices.

The image generation application 112 on the client device 106 can comprise an interface for interacting with the image generation system 110. For example, the image generation application 112 can comprise a web-based application that allows interaction with the image generation system 110, which is hosted on the server device(s) 104 in such an embodiment. Alternatively, the image generation application 112 downloads or otherwise obtains the image-guided model inversion system 102 from the image generation system 110 and synthesizes digital images independent from the server device(s) 104 after having obtained the image-guided model inversion system 102.

Additionally, as shown in FIG. 1, the system environment 100 includes the network 108. The network 108 enables communication between components of the system environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 11.

Although FIG. 1 illustrates the server device(s) 104 and the client device 106 communicating via the network 108, in alternative embodiments, the various components of the model inversion system 102 communicate and/or interact via other methods (e.g., the server device(s) 104 and the client device 106 can communicate directly). Furthermore, although FIG. 1 illustrates the model inversion system 102 being implemented by a particular component and/or device within the system environment 100, the model inversion system 102 can be implemented, in whole or in part, by other computing devices and/or components in the system environment 100 (e.g., the client device 106). Additionally, one or more of the neural networks that the model inversion system 102 utilizes may be implemented at the server device(s) 104 or at one or more other server devices or systems.

Figure 2:
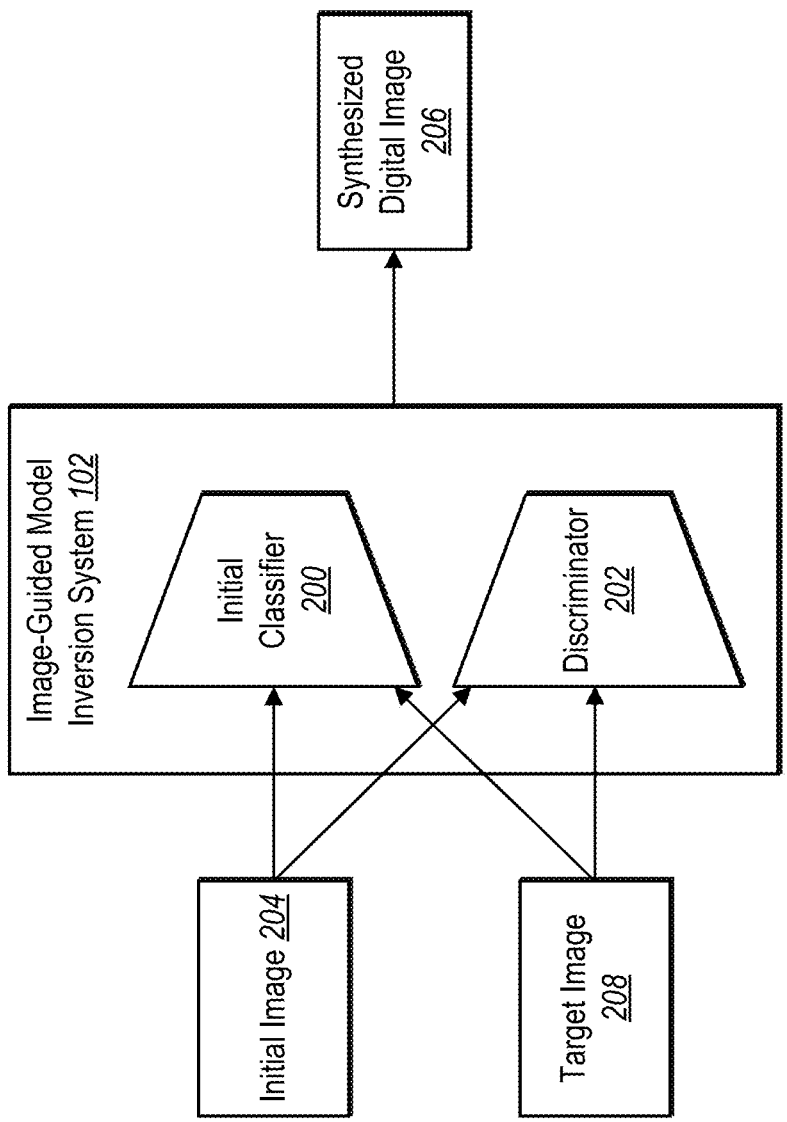
FIG. 2 illustrates an overview diagram of the image-guided model inversion system synthesizing a digital image in accordance with one or more implementations.

As mentioned above, the model inversion system 102 accurately, flexibly, and efficiently synthesizes digital images based on target images by utilizing image-guided model inversion with adversarial training. FIG. 2 illustrates an overview diagram of the image-guided model inversion system 102 ("model inversion system 102") utilizing model inversion of an image classifier 200 in combination with a discriminator 202. Specifically, FIG. 2 illustrates that the model inversion system 102 controls synthesis of a digital image by utilizing image-guided processes that impose several constraints during image synthesis.

For example, FIG. 2 illustrates that the model inversion system 102 utilizes an image classifier 200 to classify an initial image 204. In one or more embodiments, the image classifier 200 includes a neural network image classifier trained to classify digital images based on the content of the digital images. For example, the model inversion system 102 utilizes an image classifier previously trained (e.g., with established neural network parameters) on a dataset of training images. According to one or more embodiments, the model inversion system 102 utilizes an image classifier that includes a residual neural network trained on a set of diverse digital images labeled into a plurality of categories.

In one or more embodiments, in connection with labeling digital images according to a plurality of possible classifications, the image classifier 200 extracts features from the digital images. In particular, the image classifier 200 extracts and encodes feature sets that represent the content of the digital images. Based on the extracted features for a particular digital image (e.g., the initial image 204), the image classifier 200 predicts a classification for the digital image. Accordingly, when processing the initial image 204, the model inversion system 102 extracts features from the initial image 204 and then determines a classification for the initial image 204 based on the extracted features.

FIG. 2 illustrates that the model inversion system 102 utilizes the image classifier 200 to generate a synthesized digital image 206. In one or more embodiments, the model inversion system 102 leverages the extracted features of the initial image 204 to generate the synthesized digital image 206. To illustrate, the model inversion system 102 model inversion of the image classifier 200 to use information generated by the image classifier 200 to maximize the likelihood of the image classifier 200 outputting a specific predicted label for a digital image or specific layers of the image classifier 200 generating specific feature vectors.

In particular, the model inversion system 102 also classifies a target image 208 utilizing the image classifier 200 to influence the output of the image classifier 200 by utilizing a feature distribution regularizer that is based on both the initial image 204 and the target image 208. For instance, the model inversion system 102 utilizes the image classifier 200 to extract features for content of the target image 208. The model inversion system 102 then generates the synthesized digital image 206 by constraining the features extracted for the initial image 204 relative to the features extracted for the target image 208.

In addition to constraining the features of the initial image 204 relative to the features of the target image 208, FIG. 2 illustrates that the model inversion system 102 also utilizes the discriminator 202 to generate the synthesized digital image 206. For example, the model inversion system 102 compares the initial image 204 and the target image 208 via the discriminator 202 to generate realistic synthesized digital images. In one or more embodiments, the discriminator 202 includes a patch-based classifier that discriminates between the initial image 204 and the target image 208 by comparing image patches of the initial image 204 and the target image 208. The model inversion system 102 then utilizes a patch consistency regularizer based on the comparison of image patches in the initial image 204 and the target image 208 to further direct the synthesis of the synthesized digital image 206.

In one or more embodiments, the model inversion system 102 generates the synthesized digital image 206 via the image classifier 200 and the discriminator 202 in a synthesis process that iteratively refines the synthesized digital image 206. For instance, the model inversion system 102 performs a first synthesis iteration that utilizes the feature distribution regularizer and the patch consistency regularizer to constrain the features and image patches of the initial image 204 relative to the features and image patches of the target image 208. After performing the first synthesis iteration, the model inversion system 102 can perform a second synthesis iteration that utilizes the regularizers to further constrain the features and image patches relative to the target image 208.

According to one or more embodiments, the model inversion system 102 also trains the discriminator 202 to improve the synthesized digital image. Specifically, the model inversion system 102 utilizes adversarial training by alternately optimizing the synthesized digital image 206 and learning parameters (e.g., weights) of the discriminator 202. To illustrate in the example above, after the model inversion system 102 performs the first synthesis iteration, the model inversion system 102 updates the weights of the discriminator 202. The model inversion system 102 then performs the second synthesis iteration to update the synthesized digital image 206 utilizing the updated discriminator 202. Accordingly, the model inversion system 102 alternates between optimizing the synthesized digital image 206 and parameters of the discriminator 202 before finalizing the synthesized digital image 206.

Figure 3:
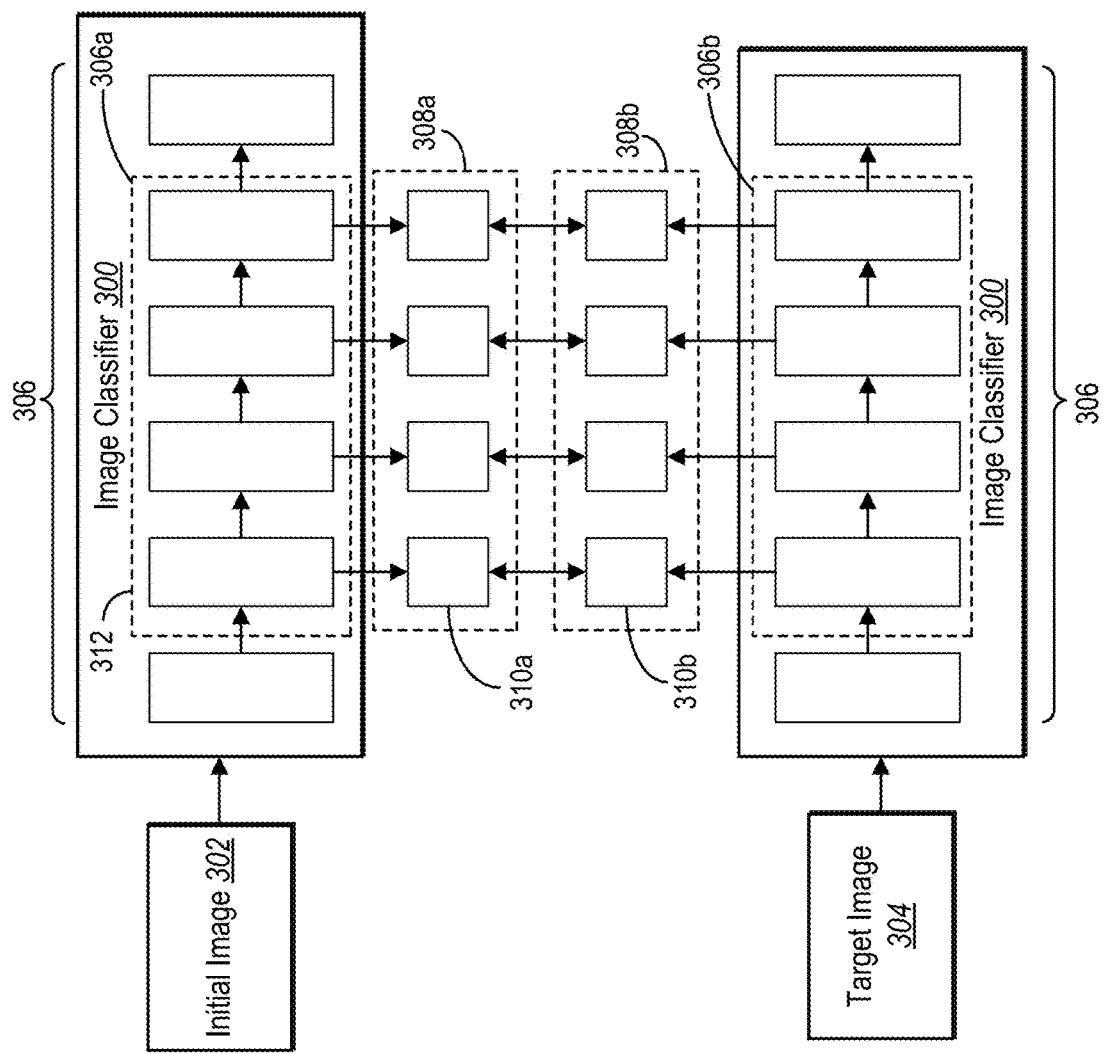
FIG. 3 illustrates a diagram of the image-guided model inversion system constraining features of an initial image relative to features of a target image in accordance with one or more implementations.

FIG. 3 illustrates additional detail associated with utilizing an image classifier to synthesize a digital image. Specifically, FIG. 3 illustrates that the model inversion system 102 constrains features of an initial image relative to a target image by leveraging an image classifier. More specifically, the image classifier generates feature sets for the images at a plurality of different neural network layers. The model inversion system 102 then constrains features of the initial image relative to the features of the target image at the plurality of network layers.

FIG. 3 illustrates that an image classifier 300 processes an initial image 302 and a target image 304 in a process for synthesizing a digital image from the initial image 302 based on the target image 304. In one or more embodiments, the image classifier 300 includes a neural network classifier that includes a plurality of layers. For instance, the image classifier 300 includes a neural network with a plurality of layers for determining a plurality of levels of abstraction when classifying each digital image. In one or more embodiments, the image classifier 300 includes a residual neural network with a plurality of layers (e.g., convolutional layers, activation layers) for image recognition tasks. To illustrate, the image classifier 300 includes a "ResNet-50" neural network, which includes a residual neural network that is 50 layers deep, as described by Kaiming He, Xiangyu Zhang, Shaoqing Ren, and Jian Sun in "Deep residual learning for image recognition," in Computer Vision and Pattern Recognition (2015) (hereinafter "Kaiming"), which is herein incorporated by reference in its entirety.

Additionally, in one or more embodiments, the image classifier 300 includes a pre-trained image classifier trained to classify digital images based on the content of the digital images utilizing a dataset of digital images. For example, the model inversion system 102 utilizes a pre-trained image classifier trained on the ImageNet dataset, which is described by Jia Deng, Wei Dong, Richard Socher, Li-Jia Li, Kai Li, and Li Fei-Fei in "Imagenet: a large-scale hierarchical image database," in 2009 IEEE Conference on Computer Vision and Pattern Recognition (2009), which is herein incorporated by reference in its entirety. Specifically, ImageNet includes a large database of annotated digital images organized by semantic hierarchy and classified into a plurality of classifications according to the content of the digital images.

Although the embodiment described above includes a ResNet-50 image classifier pre-trained on the ImageNet dataset, in one or more embodiments, the model inversion system 102 utilizes image-guided model inversion for any pre-trained image classifier including a plurality of layers. For example, the model inversion system 102 utilizes an image classifier including any number of layers (e.g., a ResNet-34 image classifier, a ResNet-101 image classifier) or other types of image classifier architectures that include a plurality of neural network layers. To illustrate, the model inversion system 102 utilizes an image classifier that includes different numbers or configurations of neural network layers, activation layers, and/or with or without residual blocks.

In one or more embodiments, the model inversion system 102 utilizes the image classifier 300 to determine a classification for the initial image 302. For instance, the image classifier 300 extracts features for the initial image 302 at a plurality of neural network layers 306 (or at a subset of the plurality of neural network layers 306). In some embodiments, the model inversion system 102 includes a plurality of convolutional layers of the image classifier 300 to extract features representing the initial image 302.

As mentioned, the image classifier 300 utilizes the extracted features to classify the initial image 302 according to a plurality of possible classifications. The model inversion system 102 utilizes model inversion of the image classifier 300 to determine features at one or more of the neural network layers 306 of the image classifier 300. For example, FIG. 3 illustrates that the model inversion system 102 determines feature sets 308 a for the initial image 302 by accessing the features generated at a subset of layers 306a of the image classifier 300. Specifically, although the image classifier 300 may include a pre-trained image classifier (e.g., a system other than the model inversion system 102 trained the image classifier 300), the model inversion system 102 is able to access the outputs of the individual layers of the image classifier 300. Accordingly, the model inversion system 102 determines the feature sets 308a from the subset of layers 306 a by accessing the outputs of the layers in the subset of layers 306a.

Additionally, FIG. 3 illustrates that the model inversion system 102 utilizes the image classifier 300 to determine a classification for the target image 304. For instance, the image classifier 300 extracts features for the target image 304 at the plurality of neural network layers 306 (or at a subset of the plurality of neural network layers 306 ). In particular, the image classifier 300 processes the target image 304 separately from the initial image 302 to classify each of the images according to the extracted features of the separate images.

Furthermore, FIG. 3 illustrates that the model inversion system 102 utilizes model inversion of the image classifier 300 to determine feature sets 308b corresponding to the target image 304 by accessing the features generated at the subset of layers 306a. Accordingly, the model inversion system 102 determines feature sets 308 a for the initial image 302 and feature sets 308b for the target image 304 by utilizing the image classifier 300 and accessing the outputs of the layers in the subset of layers 306a. In one or more embodiments, the model inversion system 102 thus extracts feature sets for the initial image 302 and the target image 304 from a pre-trained image classifier by utilizing model inversion.

In one or more embodiments, the model inversion system 102 synthesizes a digital image from the initial image 302 and based on the target image 304 by leveraging the feature sets 308a of the initial image and the feature sets 308b of the target image 304. Specifically, the model inversion system 102 generates a synthesized digital image by constraining the features of the initial image 302 relative to the features of the target image 304. For example, the model inversion system 102 utilizes a feature distribution regularizer during image synthesis to reduce a difference between statistical characteristics of features of the initial image 302 and statistical characteristics of features of the target image 304. More specifically, the model inversion system 102 utilizes the feature distribution regularizer to reduce a difference in channel-wise mean and standard deviation between the feature set 308a of the initial image 302 and the feature set 308b of the target image 304 at each layer of the subset of layers 306a.

To illustrate, the model inversion system 102 utilizes the feature distribution regularizer to reduce the difference in statistical characteristics between a first feature set 310a of the initial image 302 corresponding to a first layer 312 of the subset of layers 306a and a second feature set 310b of the target image 304 corresponding to the first layer 312 of the subset of layers 306a. In one or more embodiments, the model inversion system 102 also reduces the difference in statistical characteristics between each subsequent feature set corresponding to the subset of layers 306a between the initial image 302 and the target image 304. According to one or more embodiments, the model inversion system 102 selects layers in the subset of layers 306a that result in constraining different levels of features generated at deeper image classifier layers and shallower image classifier layers for the initial image 302.

Figure 4:
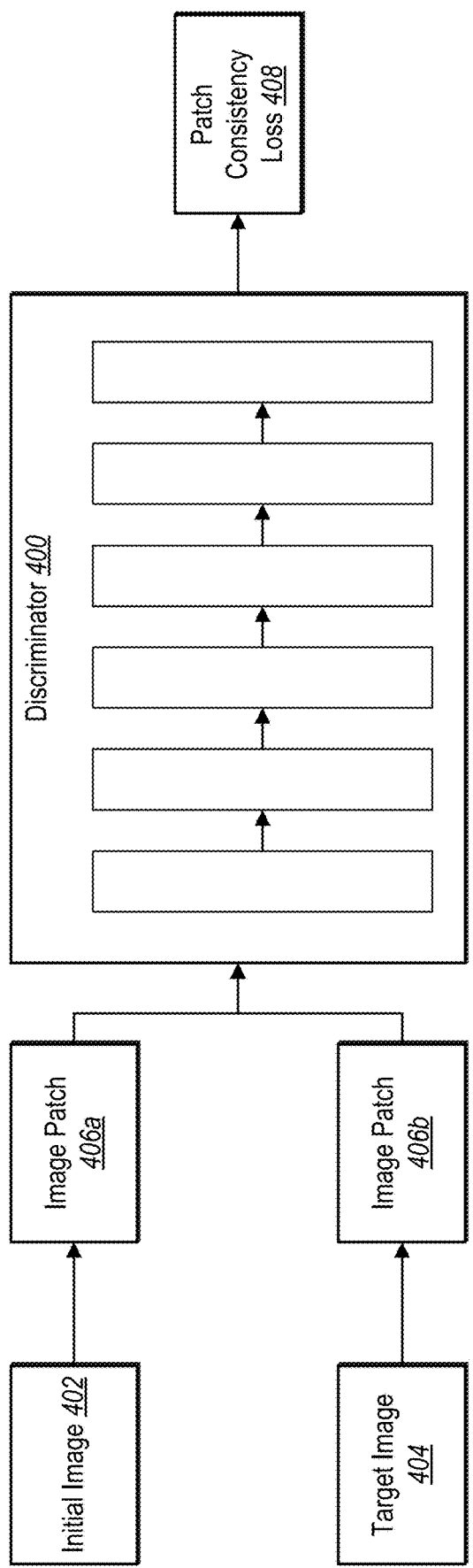
FIG. 4 illustrates a diagram of the image-guided model inversion system constraining image patches of an initial image relative to features of a target image in accordance with one or more implementations.

FIG. 4 illustrates that the model inversion system 102 utilizes a discriminator 400 to impose additional constraints during image synthesis. In one or more embodiments, in addition to constraining features of an initial image relative to a target image when synthesizing a digital image, the model inversion system 102 also constrains image patches of the initial image relative to image patches of the target image. Specifically, as mentioned previously, the model inversion system 102 utilizes a patch-based discriminator to improve the realism of the synthesized digital image. Accordingly, FIG. 4 illustrates that the discriminator 400 is a patch-based discriminator that the model inversion system 102 utilizes to improve fine levels of detail in synthesized digital images via the use of a patch consistency regularizer in addition to a feature distribution regularizer.

In one or more embodiments, the discriminator 400 includes a patch classifier that discriminates between image patches of digital images. According to one example, the discriminator 400 includes an architecture as described by Phillip Isola, Jun-Yan Zhu, Tingui Zhou, and Alexei A Efros in "Image-to-image translation with conditional adversarial networks," in Proceedings of the IEEE Conference on Computer Vision and Pattern Recognition (2017), the contents of which are hereby incorporated by reference in their entirety. For example, the discriminator 400 includes a neural network with a plurality of layers such as, but not limited to, convolutional layer(s), normalization layer(s), or activation layer(s).

FIG. 4 illustrates that the model inversion system 102 utilizes the discriminator 400 to compare image patches of an initial image 402 and a target image 404 to determine how similar the image patches of the initial image 402 are to the image patches of the target image 404. To illustrate, the discriminator 400 processes image patches of a particular size (e.g., N×N) from the initial image 402 to classify the image patches relative to image patches of the target image 404. For instance, FIG. 4 illustrates that the discriminator 400 compares a first image patch 406a of the initial image 402 to a second image patch 406b of the target image 404 to classify the first image patch 406a based on the second image patch 406b.

According to one or more embodiments, the discriminator 400 utilizes a loss function to classify the first image patch 406a. For example, FIG. 4 illustrates that the discriminator 400 determines a patch consistency loss 408 based on the first image patch 406a and the second image patch 406b. Specifically, the discriminator 400 discriminates between the first image patch 406a of the initial image 402 and the second image patch 406b of the target image 404 utilizing a loss function that produces the patch consistency loss 408. In one or more embodiments, the discriminator 400 returns a classification for the first image patch 406a based on the patch consistency loss 408.

To illustrate, in one or more embodiments, the discriminator 400 utilizes a Wasserstein loss function to determine the patch consistency loss 408. In particular, the discriminator 400 utilizes a patch classifier with a Wasserstein loss function, which can be represented as $$d^* = \mathrm{argmax}_d E_{p \sim x^0}[d(p)] - E_{p \sim \hat{x}}[d(p)],$$

in which p represents an image patch, and E represents an expected value for the image patch. Additionally, $\hat{x}$ represents the initial image 402, and $x^0$ represents the target image 404. Accordingly, in one or more embodiments, the discriminator 400 is represented as $D(\hat{x}) = E_{p \sim \hat{x}}[d^*(p)]$.

In one or more additional embodiments, the model inversion system 102 utilizes a Wasserstein gradient penalty loss function, which augments the Wasserstein loss function with a gradient norm penalty for random samples. For example, Ishaan Gulrajani, Faruk Ahmed, Martin Arjovsky, Vincent Dumoulin, and Aaron Courville describe a modified Wasserstein loss in "Improved training of Wasserstein GANs" in Advances in Neural Information Processing Systems (2017), the entire contents of which are hereby incorporated by reference. According to one or more embodiments, the model inversion system 102 utilizes a modified Wasserstein loss to improve training stability for the discriminator 400.

In one or more embodiments, the model inversion system 102 synthesizes a digital image from the initial image 402 and based on the target image 404 by leveraging information from the discriminator 400. In particular, the model inversion system 102 generates a synthesized digital image by constraining image patches of the initial image 402 relative to image patches of the target image 404. For example, the model inversion system 102 utilizes a patch consistency regularizer based on the patch consistency loss during image synthesis to reduce a patch difference between the initial image 402 and the target image 404. In one or more embodiments, the model inversion system 102 utilizes the patch consistency regularizer with a feature distribution regularizer for the image classifier (e.g., as described above with respect to FIG. 3) to generate a synthesized digital image from the initial image 402 by constraining image patches and features of the initial image 402 relative to the target image 404.

Additionally, in one or more embodiments, the model inversion system 102 adversarially trains the discriminator 400 (e.g., by updating weights or other parameters of the discriminator 400) during image synthesis. For example, the model inversion system 102 learns parameters (e.g., weights) of the discriminator 400 based on the patch consistency loss 408. In one or more embodiments, the model inversion system 102 performs iterative synthesis of a digital image based on the initial image 402 and training of the discriminator 400. To illustrate, the model inversion system 102 synthesizes a digital image based on the initial image 402 (e.g., by fixing the discriminator 400) and then trains the discriminator 400 based on the initial image 402 (e.g., by fixing the image classifier). In subsequent image synthesis iterations, in one or more embodiments, the model inversion system 102 trains the discriminator 400 based on the synthesized image(s) from the previous image synthesis steps.

As described above, the model inversion system 102 synthesizes a digital image by utilizing a plurality of regularizers to impose constraints on an initial image relative to a target image. To illustrate, in one or more embodiments, the model inversion system 102 performs image synthesis by utilizing an objective function to generate a synthesized digital image with specific features to produce a specific classification of the synthesized digital image from the image classifier 300. For example, the model inversion system 102 utilizes an objective function as:

$$x^* = \mathrm{argmin}_{\hat{x}} \mathcal{L}(f(\hat{x}), y^*) + \mathcal{R}(\hat{x}),$$

in which f (x) represents an image classifier (e.g., an image classifier implemented utilizing convolutional neural network layers) that maps images $x \in \chi$ into classes $y \in \mathcal{Y} = \{1, \ldots, C\}$ according to $$y = \underset{\hat{y}}{\mathrm{argmax}}\, f_{\hat{y}}(x).$$

Additionally, $\mathcal{L}$ is a cross-entropy loss, $\mathcal{R}$ is a regularization term, and $\hat{x}$ represents the initial image 302. In one or more embodiments, the model inversion system 102 utilizes model inversion to synthesize an image x that elicits a class response y* from the image classifier.

In additional embodiments, the model inversion system 102 utilizes one or more regularizer terms during image synthesis to impose constraints on a synthesized digital image. As described above, the model inversion system 102 constrains features of an initial image via a feature distribution regularizer. Specifically, the model inversion system 102 utilizes a feature distribution regularizer that constrains the features of the initial image relative to a target image utilizing feature statistics at a plurality of neural network layers of the image classifier. In one or more embodiments, the model inversion system 102 utilizes a feature distribution regularizer as $\mathcal{R}_{dm}(\hat{x}; x^0, \Phi) = \Sigma_{l \in \Phi} \|\mu_l(\hat{x}) - \mu_l(x^0)\|_2 + \|\sigma_l(\hat{x}) - \sigma_l(x^0)\|_2$, in which $\mu_l(x)$ and $\sigma_l(x)$ represent the channel-wise mean and standard deviation, respectively, of feature maps at the lth layer of the image classifier. Additionally $\Phi$ represents the set of layers included in the summation (e.g., a subset of layers selected from a plurality of neural network layers in the image classifier).

Additionally, as previously described, the model inversion system 102 constrains image patches of the initial image via a patch consistency regularizer. In particular, the model inversion system 102 utilizes a patch consistency regularizer that constrains the image patches of the initial image relative to the target image utilizing a discriminator. For example, the model inversion system 102 utilizes a patch consistency regularizer based on the discriminator as $\mathcal{R}_{pc}(\hat{x}) = -D(\hat{x})$. In one or more embodiments, the model inversion system 102 utilizes the patch consistency regularizer to influence image synthesis by generating synthesized digital images with image patches that the discriminator is unable to discriminate (i.e., based on visual consistency) from image patches in the target image $x^0$.

Furthermore, in one or more embodiments, the model inversion system 102 combines a plurality of regularizer terms in the objective function. Specifically, the model inversion system 102 includes the feature distribution regularizer and the patch consistency regularizer in the regularizer term of the objective function. In one or more additional embodiments, the model inversion system 102 also includes an additional image regularizer to assist in directing image synthesis away from unrealistic images. To illustrate, the model inversion system 102 utilizes a total variance loss combined with the $L_2$ norm of the image as $\mathcal{R}_{img}(\hat{x}) = \alpha \mathcal{R}_{TV}(\hat{x}) + \beta \|\hat{x}\|^2$, in which $\alpha$ and $\beta$ are scaling factors. In one or more embodiments, the additional image regularizer is described by Honxu Yin, Pavlo Molchanov, Jose M. Alvarez, Zhizhong Li, Arun Mallya, Derek Hoiem, Niraj K. Jha, and Jan Kautz in "Dreaming to distill: data-free knowledge transfer via deep-inversion," in Proceedings of the IEEE/CVF Conference on Computer Vision and Pattern Recognition (2020) (hereinafter "DeepInversion"), which is herein incorporated by reference in its entirety. Additionally, total variance is further described by Sigal Gottlieb and Chi-Wang Shu in "Total variation diminishing runge-kutta schemes" in Mathematics of Computation (1998), which is hereby incorporated by reference in its entirety. Accordingly, in one or more embodiments, a final regularizer term includes the feature distribution regularizer, the patch consistency regularizer, and the additional image regularizer as $\mathcal{R}(\hat{x}; x^0, \Phi) = \mathcal{R}_{img}(\hat{x}) + \lambda \mathcal{R}_{dm}(\hat{x}; x^0, \Phi) + \gamma \mathcal{R}_{pc}(\hat{x})$, in which $\lambda$ and $\gamma$ are scaling factors.

As described in relation to FIGS. 2-4, the model inversion system 102 performs operations for imposing constraints during image synthesis utilizing an image classifier and a discriminator. The model inversion system 102 can thus accurately and flexibly generate synthesized digital images according to a target image. Accordingly, the acts and operations illustrated and described above in relation to FIGS. 2-4 provide the corresponding acts (e.g., structure) for a step for constraining the first feature set of the initial image relative to the second feature set of the target image.

Figure 5A:
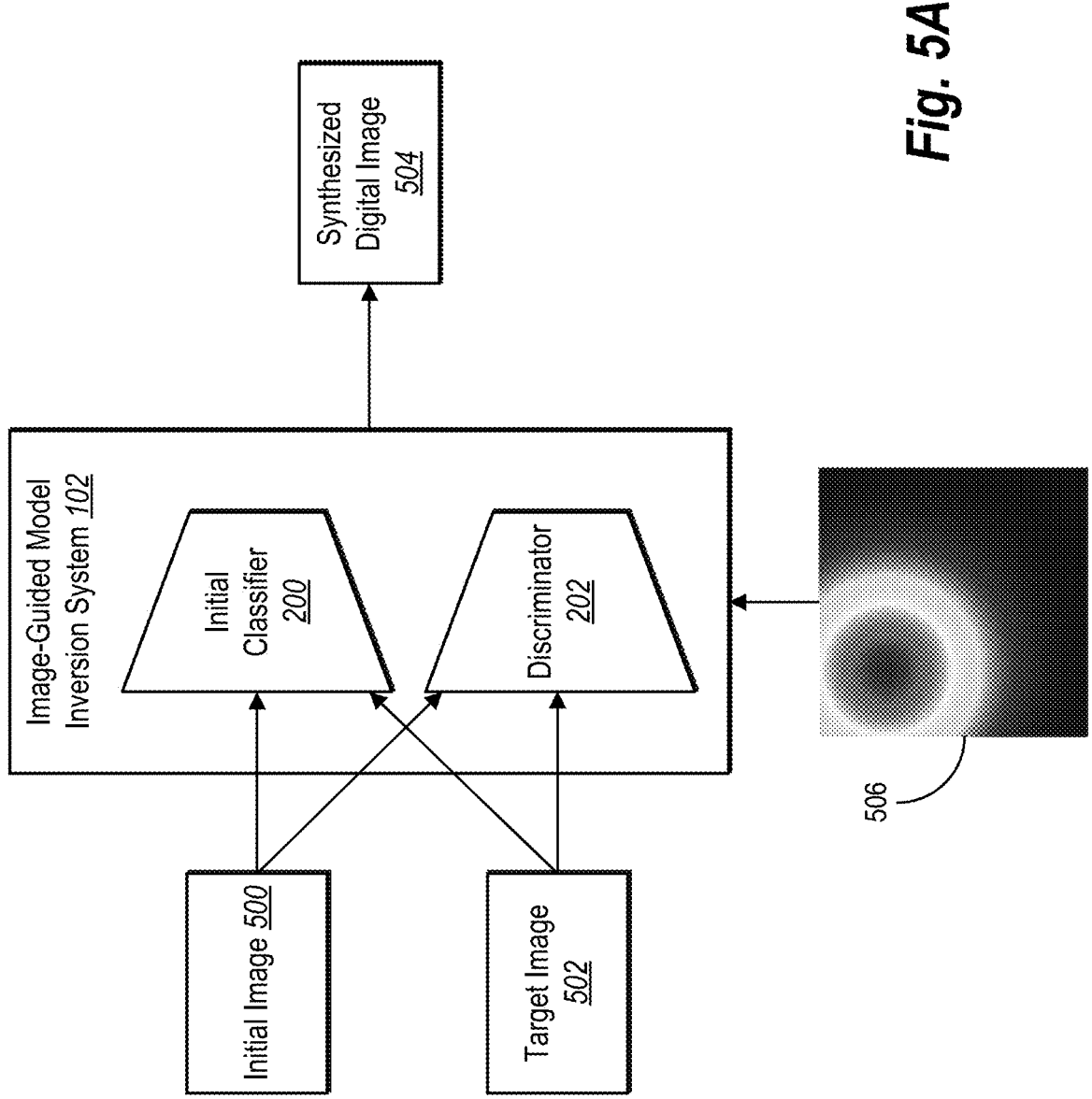
FIGS. 5A-5B illustrate diagrams of the image-guided model inversion system utilizing a saliency map to control a position of content in a synthesized digital image in accordance with one or more implementations.
Figure 5B:
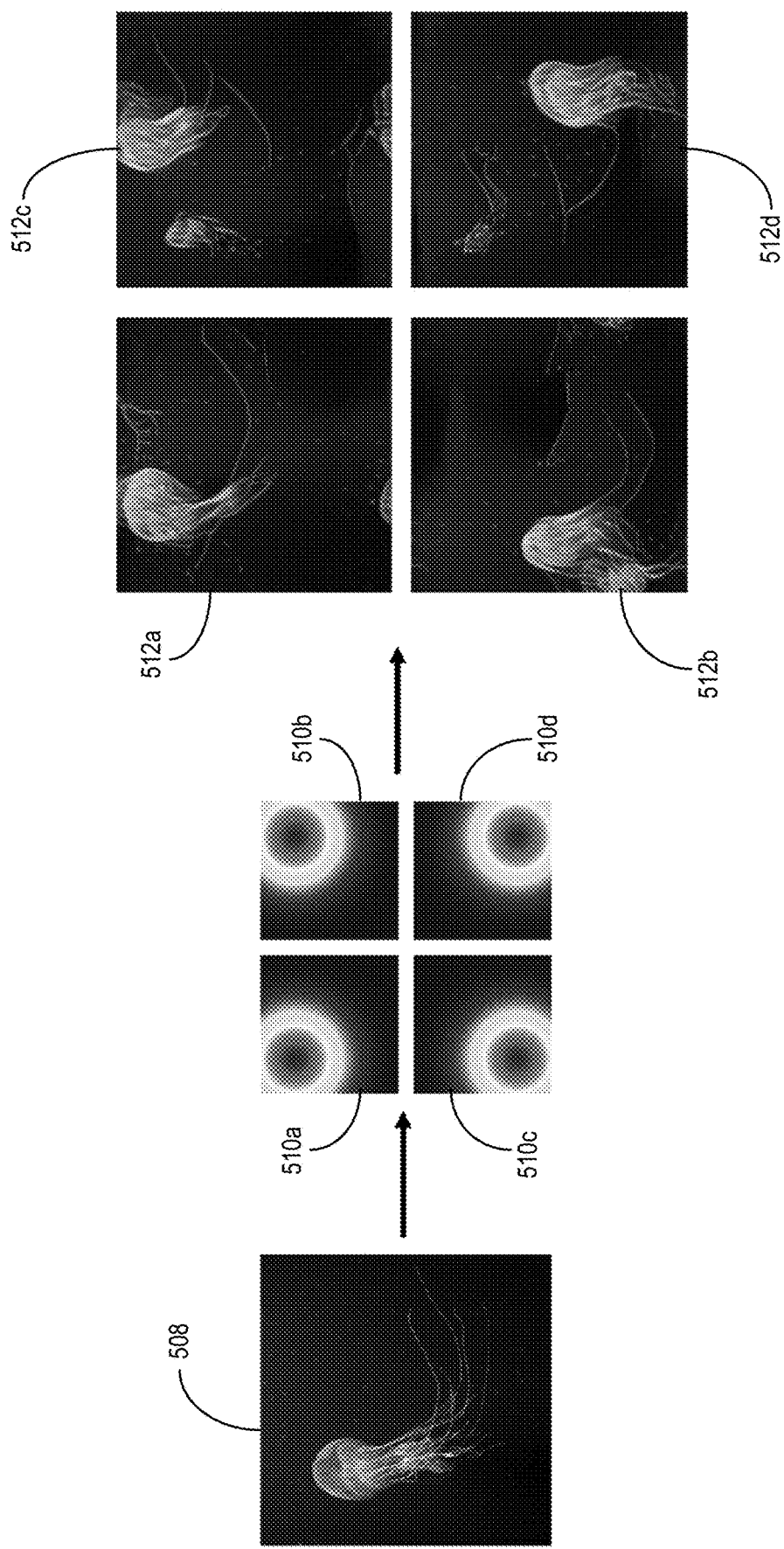
Figure 6B:
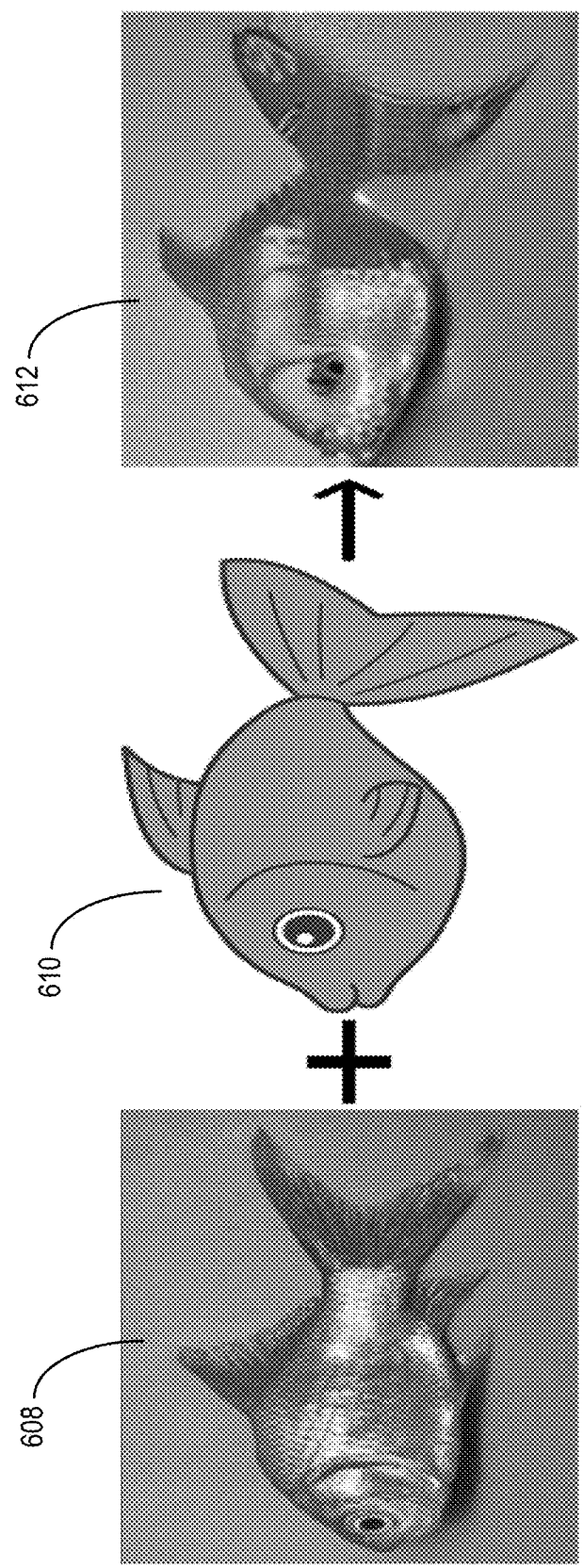
Figure 7B:
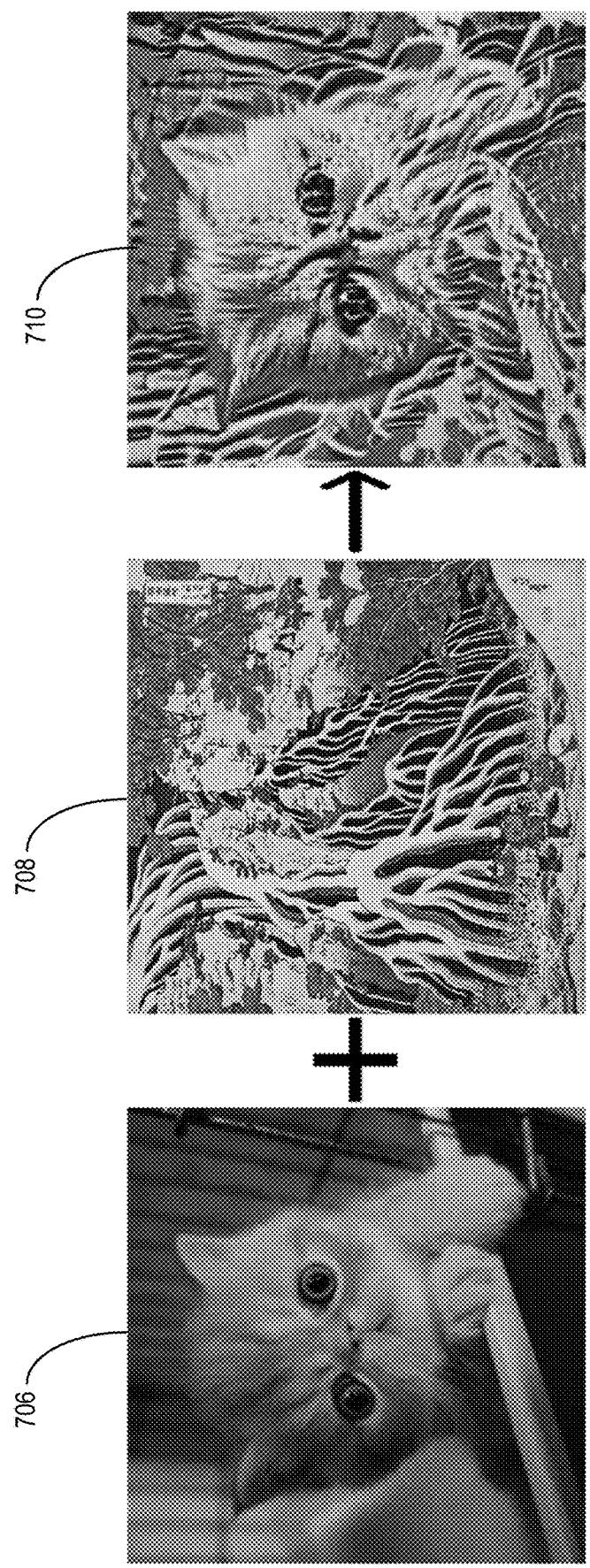

In addition to constraining synthesis of a digital image based on a target image, in one or more embodiments, the model inversion system 102 also constrains image synthesis based on one or more additional images or additional constraint data. For example, FIGS. 5A-5B illustrate the model inversion system 102 utilizing constraints on a position of content in a synthesized digital image. FIGS. 6A-6B illustrate the model inversion system 102 utilizing constraints on a shape of content in a synthesized digital image. FIGS. 7A-7B illustrate the model inversion system 102 utilizing constraints on a style of content in a synthesized digital image.

FIG. 5A illustrates an embodiment in which the model inversion system 102 controls a position of content during image synthesis. For example, FIG. 5A illustrates that the model inversion system 102 utilizes an initial image 500 and a target image 502 for generating a synthesized digital image 504 utilizing the image classifier 200 and the discriminator 202. In addition to generating the synthesized digital image 504 utilizing the target image 502, the model inversion system 102 also receives a saliency map 506 to control a position of content within the synthesized digital image 504. More specifically, the model inversion system 102 receives the saliency map 506 to control a position of one or more synthesized objects within the synthesized digital image 504.

In one or more embodiments, the saliency map 506 highlights image regions responsible for a class prediction. In particular, the model inversion system 102 leverages attribution algorithms of the image classifier 200 to influence the image synthesis. For example, the model inversion system 102 leverages attribution values for input features of a network (e.g., attribution maps for an input image), as described by Marco Ancona, Enea Ceolini, Cengiz Öztireli, and Markus Gross in "Towards better understanding of gradient-based attribution methods for deep neural networks," in International Conference on Learning Representations (2018), which is herein incorporated by reference in its entirety. In one or more embodiments, the model inversion system 102 generates an attribution map for synthesizing an image by utilizing an attribution method as described by Ramprasaath R. Selvaraju, Michael Cogswell, Abhishek, Das, Ramakrishna Vedantam, Devi Parikh, and Dhruv Batra in "Grad-cam: visual explanations from deep networks via gradient-based localization" in Proceedings of the IEEE International Conference on Computer Vision (2017), which is herein incorporated by reference in its entirety. For instance, the model inversion system 102 utilizes a weight v=10 for controlling the location of content when generating the synthesized digital image 504.

In one or more embodiments, the model inversion system 102 utilizes the saliency map 506 to influence the image synthesis by encouraging a synthesized image with an attribution map that meets a specific object location specification based on the saliency map 506. To illustrate, the model inversion system 102 utilizes a location regularizer that directs synthesis based on the saliency map 506. In one or more embodiments, the saliency map 506 includes a user-specified location (or locations) of synthesized objects in the synthesized digital image 504. For instance, the saliency map 506 includes a Gaussian "blob" at a specific location that influences the location of a synthesized object by explicitly controlling the focus of attention of the image classifier 200 while generating the synthesized digital image 504.

In one or more embodiments, the location regularizer is represented as $\mathcal{R}_{loc}(\hat{x}; a^o, y^*) = \|m(f(\hat{x}), y^*) - a^o\|_2$, in which $a^o$ represents the saliency map 506, and $m(f(x), y)$ represents the attribution map for the prediction of the object class y in the image x. Additionally, according to various embodiments, the model inversion system 102 utilizes one of a number of different algorithms to compute the attribution map $m(f(x), y)$. For example, the model inversion system 102 utilizes back-propagation $f_y(x)$ to an intermediate layer of the image classifier and combining with the layer activations to generate an attribution map for an image as a side product of the optimization that the model inversion system 102 already uses to generate the synthesized digital image 504. Thus, the model inversion system 102 efficiently controls the location of salient content in the synthesized digital image 504.

FIG. 5B illustrates an embodiment of the model inversion system 102 controlling the position of content during image synthesis. Specifically, the model inversion system 102 controls image synthesis based on a target image 508 including a jellyfish and a plurality of saliency maps 510a-510d that include different target attribution maps for synthesizing digital images. The model inversion system 102 then generates synthesized digital images 512a-512d with objects in locations based on the corresponding saliency maps 510a-510d.

For instance, the model inversion system 102 controls a position of a synthesized object in a first synthesized digital image 512a with a first saliency map 510a. In particular, the first saliency map 510a includes a Gaussian blob in an upper left corner of the first saliency map 510a, which results in the model inversion system 102 generating the first synthesized digital image 512a with the synthesized object in the upper left corner of the first synthesized digital image 512a. Similarly, the model inversion system 102 controls the positions of synthesized objects in a second synthesized digital image 512b, a third synthesized digital image 512c, and a fourth synthesized digital image 512d based on the positions of the Gaussian blobs in a second saliency map 510b, a third saliency map 510c, and a fourth saliency map 510d.

FIG. 6A illustrates an embodiment in which the model inversion system 102 controls a shape of content during image synthesis. For example, FIG. 6A illustrates that the model inversion system 102 receives an initial image 600 and a target image 602 for generating a synthesized digital image 604 utilizing the image classifier 200 and the discriminator 202. In addition to generating the synthesized digital image 604 from the initial image 600 utilizing the target image 602, the model inversion system 102 also receives a shape control image 606 to control a shape of content (e.g., one or more objects) within the synthesized digital image 604.

According to one or more embodiments, the shape control image 606 includes a specific shape for controlling feature distribution matching during image synthesis. For example, the model inversion system 102 utilizes the shape control image 606 to manipulate semantics of the synthesized digital image 604 by leveraging the image classifier 200 and using image representation at various levels of abstraction. To illustrate, the model inversion system uses the target image 602 and the shape control image 606 to match feature distributions of the initial image 600 at different layers of the image classifier 200. More specifically, different layers of the image classifier 200 impact feature distribution matching of different levels of semantics (i.e., higher network layers correspond to high level semantics of the initial image 600 and lower network layers correspond to low level semantics of the initial image 600).

In one or more embodiments, the model inversion system 102 utilizes two separate feature matching regularizers for constraining features of the initial image 600 during image synthesis. For instance, the model inversion system 102 utilizes a feature distribution regularizer including a first portion based on the target image 602 at shallower layers of the image classifier 200 and a second portion based on the shape control image 606 at deeper layers of the image classifier 200. To illustrate, the feature distribution regularizer is represented as $\mathcal{R}_{dm}(\hat{x}; x^c, \Phi^c) + \mathcal{R}_{dm}(\hat{x}; x^o, \Phi^r)$, in which $x^c$ represents the shape control image 606, $x^o$ represents the target image 602, $\Phi^c$ corresponds to deeper layers of the image classifier 200, and $\Phi^r$ corresponds to shallower layers of the image classifier 200. The model inversion system 102 thus generates the synthesized digital image 604 by combining the low-level semantics of the target image 602 and the high-level semantics (e.g., shape) of the shape control image 606. In one or more embodiments, the model inversion system 102 utilizes the ResNet-50 image classifier in Kaiming and sets $\Phi^c = \{conv4\_6\}$ and $\Phi^r = \{conv1\_1, conv2\_3, conv3\_4\}$ to represent specific layers of the image classifier 200.

FIG. 6B illustrates an embodiment of the model inversion system 102 controlling the shape of content during image synthesis. Specifically, the model inversion system 102 controls image synthesis based on a target image 608 including a fish and a shape control image 610 that includes a specific shape an object for synthesizing a digital image. The model inversion system 102 then generates a synthesized digital image 612 with a synthesized object based on an object in the target image 608 and a shape in the shape control image 610.

For instance, the model inversion system 102 controls a shape of a synthesized object in the synthesized digital image 612 with the shape control image 610. In particular, the shape control image 610 of FIG. 6B includes a clipart image of a fish. Additionally, the target image 608 includes a photograph of a real-life fish. The model inversion system 102 thus utilizes the image classifier 200 to generate the synthesized digital image 612 to include a fish based on the fish in the target image 608 with a shape corresponding to the shape of the clipart image in the shape control image 610. Thus, the model inversion system 102 provides controls for manually indicating a shape of content during image synthesis. In some embodiments, a shape control image includes any target shape (e.g., hand-drawn, computer generated, photograph).

FIG. 7A illustrates an embodiment in which the model inversion system 102 controls a style of content during image synthesis. For example, FIG. 7A illustrates that the model inversion system 102 receives a stylized image 700 and a target image 702 for generating a synthesized digital image 704 utilizing the image classifier 200 and the discriminator 202. Specifically, rather than utilizing a randomly initialized image as an initial image for processing by the image classifier 200, the model inversion system 102 controls a style of content of the synthesized digital image 704 by processing the stylized image 700. To illustrate, the stylized image 700 includes a target style for manipulating an image style of the synthesized digital image 704.

In one or more embodiments, the model inversion system 102 utilizes a feature distribution regularizer based on the stylized image 700. For example, the model inversion system 102 utilizes a feature distribution regularizer represented as $\mathcal{R}_{dm}(\hat{x}; x^0, \Phi^s)$, in which $\Phi^s = \{conv1\_1, conv2\_3, conv3\_4\}$, and $\hat{x}$ (an initial image input to the image classifier 200) is the stylized image 700. Furthermore, in one or more embodiments, the model inversion system 102 utilizes the stylized image 700 as the target image to the discriminator 202 during image synthesis. Accordingly, the model inversion system 102 optimizes image synthesis by matching features between the stylized image 700 and the target image 702 while also discriminating against the stylized image 700. The model inversion system 102 thus modifies the stylized image 700 based on the target image 702 via the feature distribution regularizer while maintaining the target style in the stylized image 700 via the discriminator 202. In one or more additional embodiments, the model inversion system 102 excludes the target image from the feature distribution regularizer.

FIG. 7B illustrates an embodiment of the model inversion system 102 controlling the style of content during image synthesis. Specifically, the model inversion system 102 controls image synthesis based on a target image 706 including a cat and a stylized image 708 that includes a specific style for synthesizing a digital image. The model inversion system 102 then generates a synthesized digital image 710 with content based on content in the target image 706 and a style in the stylized image 708.

For instance, the model inversion system 102 controls a style of content in the synthesized digital image 710 with the stylized image 708 by transferring the style of the stylized image 708 to the content of the target image 706. In particular, the target image 706 includes a photograph of a kitten, and the stylized image 708 includes artwork with a target style. The model inversion system 102 constrains features of the stylized image 708 based on the target image 706 and constrains image patches during image synthesis based on the stylized image 708. Thus, the model inversion system 102 generates the synthesized digital image 710 to include synthesized content based on one or more objects from the target image 706 and the target style of artwork in the stylized image 708.

Figure 8C:
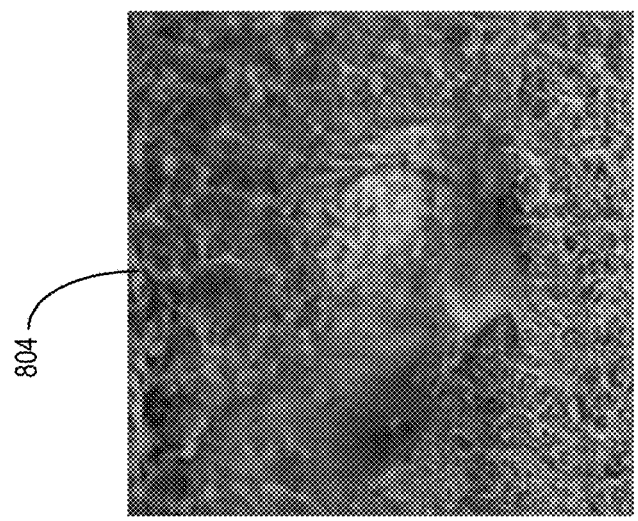
FIGS. 8A-8E illustrate synthesized digital images utilizing the image-guided model inversion system and a plurality of conventional systems in accordance with one or more implementations.
Figure 8B:
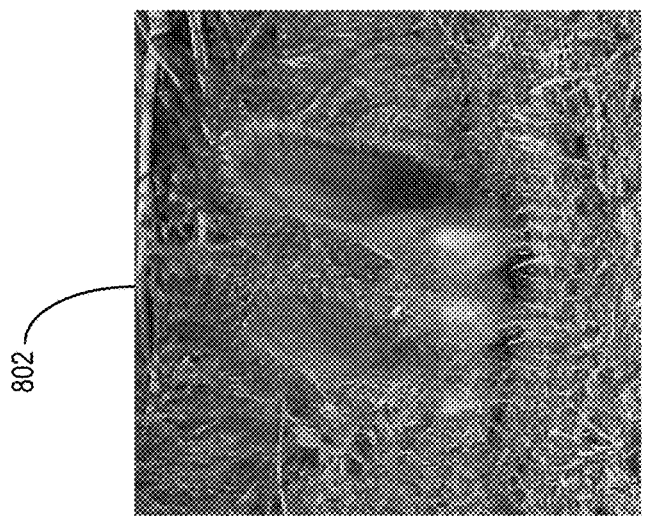
Figure 8A:
Figure 8E:
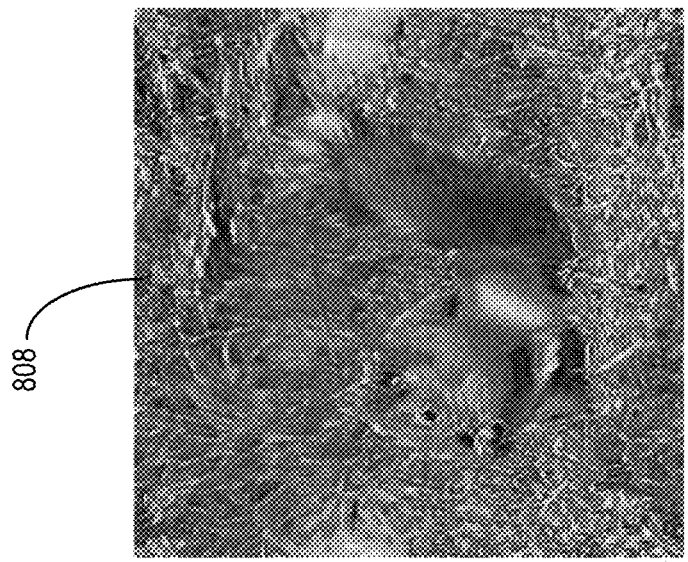
Figure 8D:
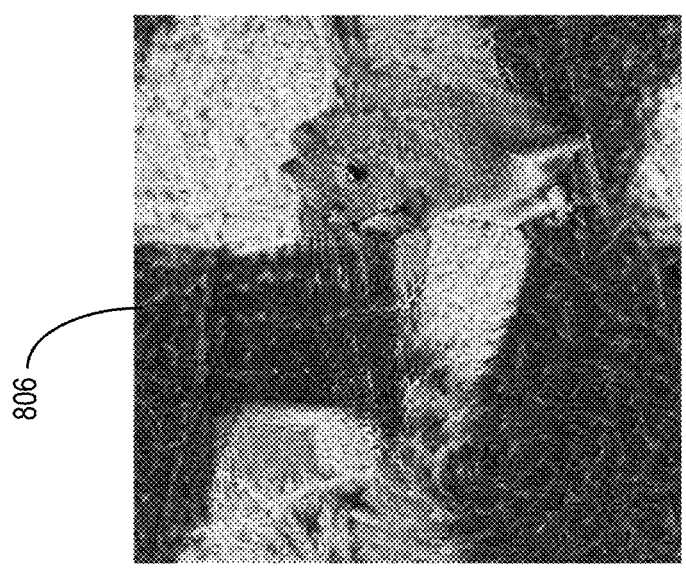

FIGS. 8A-8E illustrate embodiments of digital images associated with processes for synthesizing digital image. For example, FIG. 8A illustrates a target image 800 for synthesizing digital images. FIG. 8B illustrates a synthesized digital image 802 according to an image synthesis method described by Tamar Rott Shaham, Tali Dekel, and Tomer Michaeli in "Learning a generative model from a single natural image," in IEEE International Conference on Computer Vision (2019) (hereinafter "SinGAN"). FIG. 8C illustrates a synthesized digital image 804 according to an image synthesis method described by Xingang Pan, Xiaohang Zhan, Bo Dai, Dahua Lin, Chen Change Loy, and Pink Luo in "Exploiting deep generative prior for versatile image restoration and manipulation," in European Conference on Computer Vision (2020) (hereinafter, "DGP"). FIG. 8D illustrates a synthesized digital image 806 according to an image synthesis method described in DeepInversion, mentioned previously. FIG. 8E illustrates a synthesized digital image 808 according to image synthesis by the model inversion system 102.

As illustrated, the model inversion system 102 more accurately synthesizes a digital image based on the target image 800 with more realistic visual features and greater visual consistency to the target image 800. Additionally, Table 1 below indicates comparisons of the results of the different image synthesis methods described above in relation to FIGS. 8A-8E. In particular, Table 1 illustrates a quantitative evaluation of the model inversion system 102 ("IMAGINE" in the table below) relative to DeepInversion, SinGAN, and DGP on three different datasets—ImageNet, Places365, and DTD. In particular, Places365 is described by Bolei Zhou, Agata Lapedriza, Aditya Khosla, Aude Oliva, and Antonio Torralba in "Places: a 10 million image database for scene recognition," in IEEE Transactions on Pattern Analysis and Machine Intelligence (2017), which is herein incorporated by reference in its entirety. Additionally, DTD is described by Mircea Cimpoi, Subhransu Maji, Iasonas Kokkinos, Sammy Mohamed, and Andrea Vedaldi in "Describing textures in the wild," in IEEE Conference on Computer Vision and Pattern Recognition (2014).

| Method | Object | | | Scene | | |
| --- | --- | --- | --- | --- | --- | --- |
| | IS↑ | FID↓ | LPIPS↑ | IS↑ | FID↓ | LPIPS↑ |
| DeepInversion | 68.5(5.0) | 65.9(2.7) | 0.52(0.10) | 12.3(0.5) | 53.7(2.3) | 0.56(0.10) |
| SinGan | — | — | 0.24(0.11) | — | — | 0.27(0.08) |
| DGP | 46.3(2.4) | 46.0(1.5) | 0.30(0.09) | 12.7(0.6) | 51.3(1.6) | 0.27(0.10) |
| IMAGINE | 117.1(6.2) | 38.3(1.1) | 0.46(0.09) | 21.8(0.4) | 47.3(0.9) | 0.43(0.13) |

As illustrated, the model inversion system 102 outperforms the other methods utilizing the Inception Score ("IS") (higher is better) and Frechet Inception Distance ("FID") (lower is better) scores. The Learned Perceptual Image Patch Similarity ("LPIPS") metric is determined by measuring the patch-wise distance between all the target and synthesized image pairs. A higher value indicates that the synthesized image is more different and diverse from the target image, and vice versa. The combination of better IS and FID scores with the LPIPS score for the model inversion system 102 indicates that the model inversion system 102 produces a more diverse set of synthesized images than the DeepInversion method while also producing accurate and realistic synthesized images.

Furthermore, Table 2 illustrates a comparison of realism and diversity of synthesized digital images produced by the model inversion system 102 relative to the conventional methods. Specifically, the comparisons were made by human users of a crowdsourced site in which respondents scored synthetic images according to realism and diversity (i.e., by selecting a more realistic image in an image comparison and a more diverse image in an image comparison). The results in Table 2 indicate that even though DeepInversion performed better than the model inversion system 102 in terms of diversity with regard to the LPIPS score, human users indicate that the model inversion system 102 outperformed DeepInversion.

|  | DeepInversion/ IMAGINE | SinGAN/ IMAGINE | DGP/ IMAGINE |
|---|---|---|---|
| Object | | | |
| Realism | $1.0/99.0_{2.0,\ 1.4}$ | $29.5/70.5_{10.3,\ 6.0}$ | $26.0/74.0_{8.3,\ 6.1}$ |
| Diversity | $26.5/73.5_{17.5,\ 6.7}$ | $17.5/82.5_{6.8,\ 5.3}$ | $28.5/71.5_{7.1,\ 6.3}$ |
| Scene | | | |
| Realism | $2.0/98.0_{2.5,\ 2.0}$ | $35.5/64.5_{10.3,\ 6.0}$ | $34.0/66.0_{7.0,\ 6.6}$ |
| Diversity | $18.0/82.0_{8.7,\ 5.3}$ | $19.5/80.5_{10.1,\ 6.0}$ | $23.5/76.5_{10.5,\ 5.9}$ |

Figure 9:
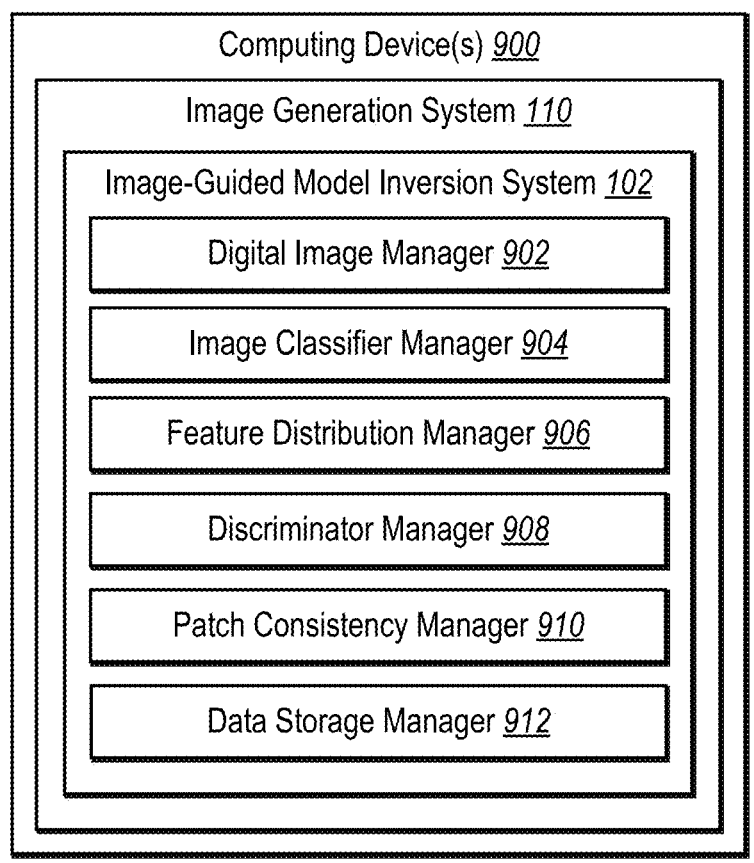
FIG. 9 illustrates a diagram of the image-guided model inversion system of FIG. 1 in accordance with one or more implementations.

FIG. 9 illustrates a detailed schematic diagram of an embodiment of the model inversion system 102 described above. As shown, the model inversion system 102 is implemented in an image generation system 110 on computing device(s) 900 (e.g., a client device and/or server device as described in FIG. 1, and as further described below in relation to FIG. 11). Additionally, in one or more embodiments, the model inversion system 102 includes, but is not limited to, a digital image manager 902, an image classifier manager 904, a feature distribution manager 906, a discriminator manager 908, a patch consistency manager 910, and a data storage manager 912. The model inversion system 102 can be implemented on any number of computing devices. In one or more embodiments, the model inversion system 102 is implemented in a distributed system of server devices for digital content editing. In alternative embodiments, the model inversion system 102 is implemented within one or more additional systems. Alternatively, the model inversion system 102 may be implemented on a single computing device such as a single client device.

In one or more embodiments, each of the components of the model inversion system 102 is in communication with other components using any suitable communication technologies. Additionally, in some embodiments, the components of the model inversion system 102 are in communication with one or more other devices including other computing devices of a user, server devices (e.g., cloud storage devices), licensing servers, or other devices/systems. It will be recognized that although the components of the model inversion system 102 are shown to be separate in FIG. 9, any of the subcomponents may be combined into fewer components, such as into a single component, or divided into more components as may serve a particular implementation. Furthermore, although the components of FIG. 9 are described in connection with the model inversion system 102, in one or more embodiments, at least some of the components for performing operations in conjunction with the model inversion system 102 described herein are implemented on other devices within the environment.

In some embodiments, the components of the model inversion system 102 include software, hardware, or both. For example, the components of the model inversion system 102 include one or more instructions stored on a computer-readable storage medium and executable by processors of one or more computing devices (e.g., the computing device(s) 900). When executed by the one or more processors, the computer-executable instructions of the model inversion system 102 can cause the computing device(s) 900 to perform the image synthesis operations described herein. Alternatively, the components of the model inversion system 102 can include hardware, such as a special purpose processing device to perform a certain function or group of functions. Additionally, or alternatively, the components of the model inversion system 102 can include a combination of computer-executable instructions and hardware.

Furthermore, the components of the model inversion system 102 performing the functions described herein with respect to the model inversion system 102 may, for example, be implemented as part of a stand-alone application, as a module of an application, as a plug-in for applications, as a library function or functions that may be called by other applications, and/or as a cloud-computing model. Thus, the components of the model inversion system 102 may be implemented as part of a stand-alone application on a personal computing device or a mobile device. Alternatively, or additionally, the components of the model inversion system 102 may be implemented in any application that provides three-dimensional image rendering, including, but not limited to ADOBE® PHOTOSHOP®, ILLUSTRATOR® or CREATIVE CLOUD® software. "ADOBE", "PHOTOSHOP," "ILLUSTRATOR," AND "CREATIVE CLOUD" are either registered trademarks or trademarks of Adobe Inc. in the United States and/or other countries.

As described above, in some embodiments, the model inversion system 102 includes a digital image manager 902. For example, the digital image manager 902 manages digital images for synthesizing digital images. To illustrate, the digital image manager 902 determines initial images to use for synthesizing digital images. For example, the digital image manager 902 generates initialize randomized images or obtains (or otherwise identifies) stylized images to use as initial images for synthesizing digital images. Additionally, the digital image manager 902 obtains (or otherwise identifies) target images for synthesizing digital images. The digital image manager 902 also communicates with the feature distribution manager 906 and the patch consistency manager 910 to synthesize digital images based on initial images and target images.

In one or more embodiments, the model inversion system 102 includes an image classifier manager 904 to manage an image classifier. For example, the image classifier manager 904 obtains a pre-trained image classifier (e.g., via a third-party system) for classifying digital images during image synthesis. In some embodiments, the image classifier manager 904 also trains the image classifier prior utilizing a training dataset prior to image synthesis.

According to one or more embodiments, the model inversion system 102 includes a feature distribution manager 906 to impose constraints based on feature distribution matching during image synthesis. For instance, the feature distribution manager 906 obtains feature sets for an initial image and a target image from an image classifier (e.g., by communicating with the image classifier manager 904). The feature distribution manager 906 also utilizes a feature distribution regularizer to constrain the feature set of the initial image relative to the feature set of the target image during image synthesis.

In additional embodiments, the model inversion system 102 includes a discriminator manager 908 to manage a discriminator during image synthesis. To illustrate, the discriminator manager 908 utilizes a patch-based discriminator to discriminate an initial image from a target image based on image patches of the initial image and the target image. Additionally, the discriminator manager 908 trains the discriminator during image synthesis by learning weights of the discriminator based on the initial image (and the synthesized digital image during subsequent iterations of image synthesis) and the target image.

The model inversion system 102 also includes a patch consistency manager 910 to impose constraints based on patch consistency during image synthesis. For example, the patch consistency manager 910 utilizes a patch-based discriminator (e.g., by communicating with the discriminator manager 908) to determine a patch consistency regularizer. Additionally, the patch consistency manager 910 utilizes the patch consistency regularizer to constrain image patches of the initial image relative to image patches of the target image during image synthesis.

Additionally, the model inversion system 102 also includes a data storage manager 912 (that comprises a non-transitory computer memory/one or more memory devices) that stores and maintains data associated with synthesizing digital images. For example, the data storage manager 912 stores one or more neural networks (e.g., an image classifier, a discriminator). The data storage manager 912 also stores information associated with digital images (e.g., initial images, target images), saliency maps, shape control images, stylized images, and synthesized digital images (e.g., during each iteration of an image synthesis process).

Figure 10:
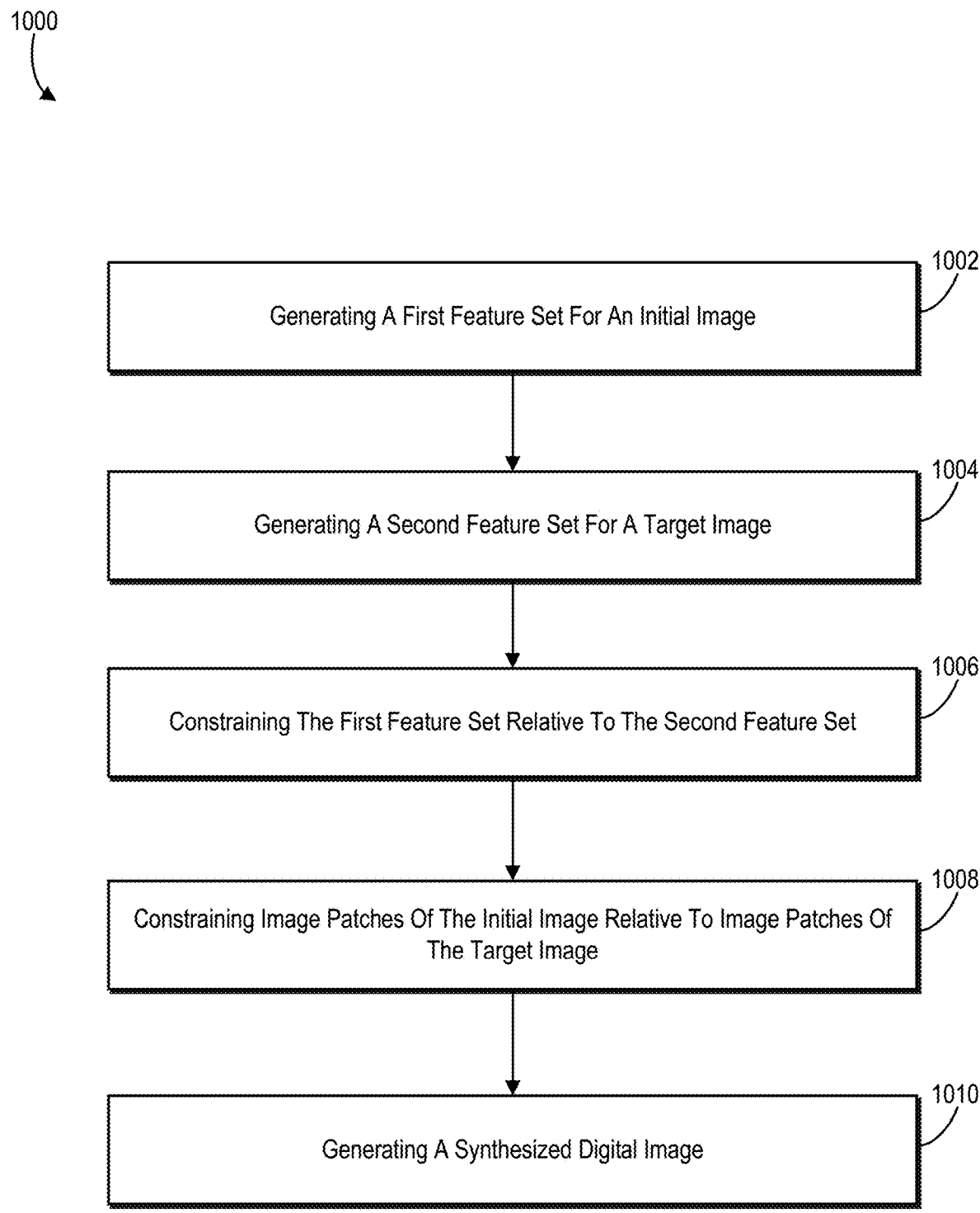
FIG. 10 illustrates a flowchart of a series of acts for utilizing image-guided model inversion of an image classifier with a discriminator to synthesize a digital image in accordance with one or more implementations.

Turning now to FIG. 10, this figure shows a flowchart of a series of acts 1000 of synthesizing digital images utilizing model inversion of an image classifier with a discriminator. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer readable medium can comprise instructions, that when executed by one or more processors, cause a computing device to perform the acts of FIG. 10. In still further embodiments, a system can perform the acts of FIG. 10.

As shown, the series of acts 1000 includes an act 1002 of generating a first feature set for an initial image. For example, act 1002 involves generating, utilizing an encoder of a neural network image classifier, a first feature set for an initial image. For instance, act 1002 can involve generating the first feature set based on features extracted for the initial image at a plurality of layers of the image classifier. Additionally, in one or more embodiments, the image classifier includes a pre-trained image classifier including a plurality of convolutional layers.

In one or more embodiments, the initial image comprises a randomly initialized noise image. In one or more alternative embodiments, the initial image comprises a stylized image comprising a target style for the synthesized digital image.

The series of acts 1000 also includes an act 1004 of generating a second feature set for a target image. For example, act 1004 involves generating, utilizing the encoder of the neural network image classifier, a second set feature set for a target image. For instance, act 1004 can involve generating the second feature set based on features extracted for the target image at the plurality of layers of the image classifier.

The series of acts 1000 further includes an act 1006 of constraining the first feature set relative to the second feature set. For example, act 1006 involves constraining the first feature set generated for the initial image utilizing the image classifier relative to the second feature set generated for the target image utilizing the image classifier. To illustrate, act 1006 can involve utilizing a feature distribution regularizer to reduce a feature distance between the first feature set and the second feature set at one or more layers of the image classifier. For example, act 1006 can involve reducing a channel-wise mean and a standard deviation between the first feature set and the second feature set at the plurality of layers of the image classifier.

Additionally, in one or more embodiments including a stylized image as the initial image, act 1006 involves constraining, utilizing the first image regularizer, the first feature set of the stylized image relative to the second feature set of the target image at a subset of the plurality of layers of the encoder of the neural network image classifier.

Additionally, the series of acts 1000 includes an act 1008 of constraining image patches of the initial image relative to image patches of the target image. For example, act 1008 involves constraining, utilizing a patch-based discriminator, first image patches of the initial image relative to second image patches of the target image. For instance, act 1008 can involve utilizing a patch consistency regularizer to reduce a patch difference between the first image patches and the second image patches. To illustrate, act 1008 can involve determining a patch consistency loss based on expected values of the first image patches and expected values of the second image patches. Act 1008 can further involve constraining the first image patches relative to the second image patches by reducing the patch consistency loss.

The series of acts 1000 also includes an act 1010 of generating a synthesized digital image. For example, act 1010 involves generating a synthesized digital image from the initial image based on the constrained first feature set of the initial image. In one or more embodiments, act 1010 also involves generating the synthesized digital image from the initial image based on the constrained first image patches of the initial image.

In one or more embodiments, act 1010 involves generating a final synthesized digital image by alternately synthesizing digital images utilizing the image classifier based on the target image and learning parameters of the patch-based discriminator. For example, act 1010 can involve iteratively synthesizing a plurality of digital images based on a randomly initialized noise image relative to the target image by utilizing the encoder of the neural network image classifier and the patch-based discriminator. To illustrate, act 1010 can involve updating parameters of the patch-based discriminator based on the synthesized digital image. Act 1010 can then involve generating an updated synthesized digital image by constraining, utilizing the patch-based discriminator with the updated parameters, synthesized image patches of the synthesized digital images relative to the second image patches by utilizing the second image regularizer to reduce the patch difference between the synthesized image patches and the second image patches.

In one or more embodiments, the series of acts 1000 includes receiving, in connection with the target image, a saliency map comprising an indication of a target position. Additionally, the series of acts 1000 can include constraining a position of an object in the synthesized digital image to the target position based on the saliency map by utilizing a location regularizer. In one or more embodiments, the series of acts 1000 includes receiving, in connection with the target image, a plurality of saliency maps comprising indications of a plurality of target positions. The series of acts 1000 can then include constraining, for each digital image of the plurality of digital images, a position of an object to one of the plurality of target positions based on the plurality of saliency map by utilizing a location regularizer.

In one or more embodiments, the series of acts 1000 includes receiving, in connection with the target image, a shape control image comprising a target shape for an object in the synthesized digital image. Additionally, the series of acts 100 can include constraining a shape of an object in the synthesized digital image to the target shape based on the target image and the shape control image by utilizing a first feature distribution regularizer associated with the target image and a second feature distribution regularizer associated with the shape control image. For example, act 1006 can involve constraining the first feature set of the initial image relative to the second feature set of the target image in a first set of layers of an encoder of the image classifier by utilizing the first feature distribution regularizer. Additionally, act 1006 can further involve constraining the first feature set of the initial image to a third feature set generated for the shape control image utilizing the image classifier in a second set of layers of the encoder of the image classifier by utilizing the second feature distribution regularizer.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
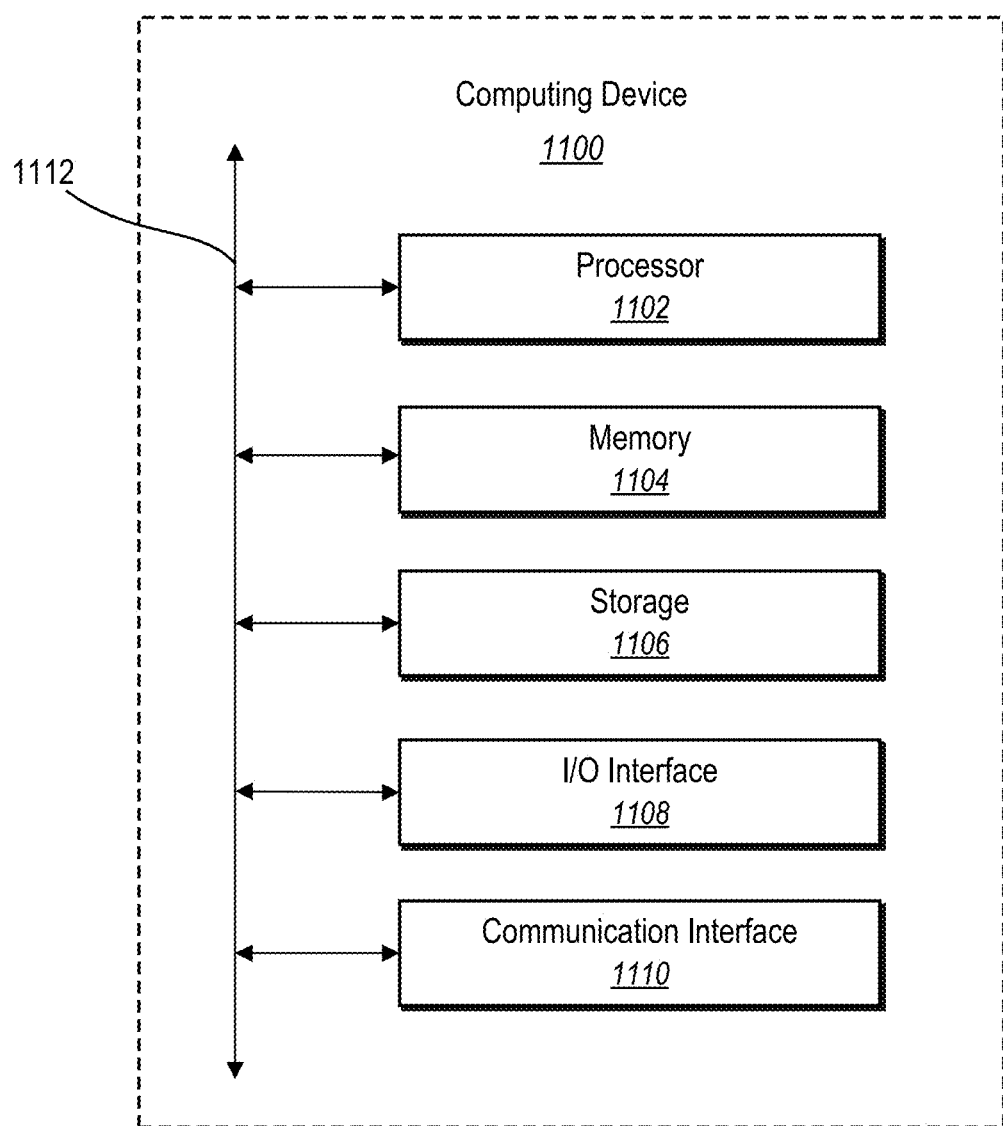
FIG. 11 illustrates a block diagram of an exemplary computing device in accordance with one or more embodiments.

FIG. 11 illustrates a block diagram of exemplary computing device 1100 that may be configured to perform one or more of the processes described above. One will appreciate that one or more computing devices such as the computing device 1100 may implement the system(s) of FIG. 1. As shown by FIG. 11, the computing device 1100 can comprise a processor 1102, a memory 1104, a storage device 1106, an I/O interface 1108, and a communication interface 1110, which may be communicatively coupled by way of a communication infrastructure 1112. In certain embodiments, the computing device 1100 can include fewer or more components than those shown in FIG. 11. Components of the computing device 1100 shown in FIG. 11 will now be described in additional detail.

In one or more embodiments, the processor 1102 includes hardware for executing instructions, such as those making up a computer program. As an example, and not by way of limitation, to execute instructions for dynamically modifying workflows, the processor 1102 may retrieve (or fetch) the instructions from an internal register, an internal cache, the memory 1104, or the storage device 1106 and decode and execute them. The memory 1104 may be a volatile or non-volatile memory used for storing data, metadata, and programs for execution by the processor(s). The storage device 1106 includes storage, such as a hard disk, flash disk drive, or other digital storage device, for storing data or instructions for performing the methods described herein.

The I/O interface 1108 allows a user to provide input to, receive output from, and otherwise transfer data to and receive data from computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example, and not by way of limitation, the communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1110 may facilitate communications with various types of wired or wireless networks. The communication interface 1110 may also facilitate communications using various communication protocols. The communication infrastructure 1112 may also include hardware, software, or both that couples components of the computing device 1100 to each other. For example, the communication interface 1110 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computing device to:
synthesize a digital image based on a target image providing an image guide by:
generating a first feature set comprising feature vectors of an initial image via a plurality of separate neural network layers of an image classifier at a plurality of resolutions;
generating a second feature set comprising feature vectors of a target image via the plurality of separate neural network layers of the image classifier at the plurality of resolutions;
constraining, at the plurality of separate neural network layers of the image classifier at the plurality of resolutions, the feature vectors of the first feature set relative to corresponding feature vectors of the second feature set; and constraining, utilizing a patch-based discriminator, first image patches of the initial image relative to second image patches of the target image.

2. The non-transitory computer readable storage medium as recited in claim 1, further comprising instructions that, when executed by the at least one processor, cause the computing device to constrain the feature vectors of the first feature set relative to the feature vectors of the second feature set by utilizing a feature distribution regularizer to reduce a feature distance between a feature vector of the first feature set and a feature vector of the second feature set at a layer of the image classifier.

3. The non-transitory computer readable storage medium as recited in claim 1, further comprising instructions that, when executed by the at least one processor, cause the computing device to constrain the first image patches relative to the second image patches by utilizing a patch consistency regularizer to reduce a patch difference between the first image patches and the second image patches.

4. The non-transitory computer readable storage medium as recited in claim 1, further comprising instructions that, when executed by the at least one processor, cause the computing device to generate a final synthesized digital image by alternately synthesizing digital images utilizing the image classifier based on the target image and learning parameters of the patch-based discriminator.

5. The non-transitory computer readable storage medium as recited in claim 1, further comprising instructions that, when executed by the at least one processor, cause the computing device to:
receive, in connection with the target image, a saliency map comprising an indication of a target position; and
constrain a position of an object in the synthesized digital image to the target position based on the saliency map by utilizing a location regularizer.

6. The non-transitory computer readable storage medium as recited in claim 1, further comprising instructions that, when executed by the at least one processor, cause the computing device to:
receive, in connection with the target image, a shape control image comprising a target shape for an object in the synthesized digital image; and
constrain a shape of an object in the synthesized digital image to the target shape based on the target image and the shape control image by utilizing a first feature distribution regularizer associated with the target image and a second feature distribution regularizer associated with the shape control image.

7. The non-transitory computer readable storage medium as recited in claim 6, further comprising instructions that, when executed by the at least one processor, cause the computing device to:
constrain the first feature set of the initial image relative to the second feature set of the target image in a first set of layers of an encoder of the image classifier by utilizing the first feature distribution regularizer; and
constrain the first feature set of the initial image relative to a third feature set generated for the shape control image utilizing the image classifier in a second set of layers of the encoder of the image classifier by utilizing the second feature distribution regularizer.

8. The non-transitory computer readable storage medium as recited in claim 1, wherein the initial image comprises a randomly initialized noise image.

9. The non-transitory computer readable storage medium as recited in claim 1, wherein the initial image comprises a stylized image comprising a target style for the synthesized digital image.

10. A system comprising:
a memory device comprising a digital target image; and
one or more processors configured to cause the system to:
synthesize a digital image based on the target image by:
generate, utilizing a plurality of separate neural network layers of an encoder of a neural network image classifier at a plurality of resolutions, a first feature set comprising feature vectors for an initial image and a second feature set comprising feature vectors for the target image;
constrain the feature vectors of the first feature set of the initial image relative to corresponding feature vectors of the second feature set of the target image by utilizing a first image regularizer to reduce a feature distance between the feature vectors of the first feature set and corresponding feature vectors of the second feature set at a plurality of layers of the encoder of the neural network image classifier at the plurality of resolutions; and
constrain, utilizing a patch-based discriminator, first image patches of the initial image relative to second image patches of the target image by utilizing a second image regularizer to reduce a patch difference between the first image patches and the second image patches.

11. The system as recited in claim 10, wherein the one or more processors are further configured to cause the system to utilize the first image regularizer to reduce the feature distance between the first feature set and the second feature set by reducing a channel-wise mean and a standard deviation between the feature vectors of the first feature set and the feature vectors of the second feature set at the plurality of layers of the neural network image classifier.

12. The system as recited in claim 10, wherein the one or more processors are further configured to cause the system to constrain the first image patches relative to the second image patches by:
determining a patch consistency loss based on expected values of the first image patches and expected values of the second image patches; and
constraining the first image patches relative to the second image patches by reducing the patch consistency loss.

13. The system as recited in claim 12, wherein the one or more processors are further configured to cause the system to:
update parameters of the patch-based discriminator based on the synthesized digital image; and
generate an updated synthesized digital image by constraining, utilizing the patch-based discriminator with the updated parameters, synthesized image patches of the synthesized digital images relative to the second image patches by utilizing the second image regularizer to reduce the patch difference between the synthesized image patches and the second image patches.

14. The system as recited in claim 10, wherein the one or more processors are further configured to cause the system to synthesize a plurality of digital images by:
receiving, in connection with the target image, a plurality of saliency maps comprising indications of a plurality of target positions; and
constraining, for each digital image of the plurality of digital images, a position of an object to one of the plurality of target positions based on the plurality of saliency maps by utilizing a location regularizer.

15. The system as recited in claim 10, wherein the one or more processors are further configured to cause the system to:
receive, in connection with the target image, a shape control image comprising a target shape for an object in the synthesized digital image;
constrain a shape of the object in the synthesized digital image to the target shape based on the target image and the shape control image by:
constraining the feature vectors of the first feature set of the initial image to the feature vectors of the second feature set of the target image in a first subset of the plurality of layers of the encoder of the neural network image classifier; and
constraining the feature vectors of the first feature set of the initial image to feature vectors of a third feature set generated for the shape control image utilizing the neural network image classifier in a second subset of the plurality of layers of the encoder of the neural network image classifier.

16. The system as recited in claim 10, wherein:
the initial image comprises a randomly initialized noise image; and
the one or more processors are further configured to cause the system to iteratively synthesize a plurality of digital images based on the randomly initialized noise image relative to the target image by utilizing the encoder of the neural network image classifier and the patch-based discriminator.

17. The system as recited in claim 10, wherein:
the initial image comprises a stylized image comprising a target style for the synthesized digital image; and
the one or more processors are further configured to cause the system to:
generate the first feature set for the stylized image; and
constrain, utilizing the first image regularizer, the first feature set of the stylized image relative to the second feature set of the target image at a subset of the plurality of layers of the encoder of the neural network image classifier.

18. A method comprising:
generating, utilizing a plurality of separate neural network layers of an encoder of a neural network image classifier at a plurality of resolutions, feature vectors of a first feature set for an initial image;
generating, utilizing the plurality of separate neural network layers of the encoder of the neural network image classifier at a plurality of resolutions, feature vectors of a second feature set for a target image;
performing a step for constraining the first feature set of the initial image relative to the second feature set of the target image; and
generating a synthesized digital image from the initial image based on the constrained first feature set of the initial image.

19. The method as recited in claim 18, further comprising:
receiving a saliency map comprising an indication of a target position; and
wherein generating the synthesized digital image comprises generating a digital image comprising an object with a position based on the target position.

20. The method as recited in claim 18, further comprising:
receiving a shape control image comprising a target shape for an object in the synthesized digital image; and
wherein generating the synthesized digital image comprises generating digital image comprising the object with a shape corresponding to the target shape.

* * * * *